US012769222B2

(12) United States Patent
Yamasaki et al.

(10) Patent No.: US 12,769,222 B2
(45) Date of Patent: Oct. 20, 2026

(54) FERRITE PARTICLE, CARRIER FOR ELECTROPHOTOGRAPHIC DEVELOPER, ELECTROPHOTOGRAPHIC DEVELOPER, AND METHOD FOR PRODUCING FERRITE PARTICLE

(71) Applicant: POWDERTECH CO., LTD., Kashiwa (JP)

(72) Inventors: Yuzuru Yamasaki, Kashiwa (JP); Makoto Ishikawa, Kashiwa (JP); Tetsuya Uemura, Kashiwa (JP)

(73) Assignee: POWDERTECH CO., LTD, Kashiwa (JP)

( * ) Notice: Subject to any disclaimer, the term of this patent is extended or adjusted under 35 U.S.C. 154(b) by 498 days.

(21) Appl. No.: 18/564,577

(22) PCT Filed: May 27, 2022

(86) PCT No.: PCT/JP2022/021792
§ 371 (c)(1),
(2) Date: Nov. 27, 2023

(87) PCT Pub. No.: WO2022/250150
PCT Pub. Date: Dec. 1, 2022

(65) Prior Publication Data

US 2024/0264546 A1 Aug. 8, 2024

(30) Foreign Application Priority Data

May 28, 2021 (JP) ................................ 2021-089756

(51) Int. Cl.
*C01G 49/06* (2006.01)
*G03G 9/107* (2006.01)

(52) U.S. Cl.
CPC .......... *G03G 9/1085* (2020.08); *C01G 49/06* (2013.01); *C01P 2002/32* (2013.01); *C01P 2002/70* (2013.01); *C01P 2006/12* (2013.01)

(58) Field of Classification Search
CPC ........... C01G 49/06; C01G 49/0072;qa C01G 49/0036; G03G 9/1085; G03G 9/108
See application file for complete search history.

(56) References Cited

U.S. PATENT DOCUMENTS

| | | | |
|---|---|---|---|
| 6,284,150 B1 | 9/2001 | Ogata et al. | |
| 2001/0023933 A1 | 9/2001 | Ogata et al. | |
| 2002/0177061 A1* | 11/2002 | Kobayashi ........... | G03G 9/1075 430/111.32 |
| 2007/0246681 A1 | 10/2007 | Minachi et al. | |
| 2013/0171558 A1 | 7/2013 | Suwa et al. | |
| 2018/0059565 A1* | 3/2018 | Kamae ................. | G03G 9/0918 |
| 2018/0107129 A1 | 4/2018 | Ishikawa et al. | |
| 2019/0304641 A1 | 10/2019 | Morita et al. | |
| 2021/0132520 A1 | 5/2021 | Kawauchi et al. | |

FOREIGN PATENT DOCUMENTS

| | | | |
|---|---|---|---|
| CN | 1256785 | A | 6/2000 |
| CN | 1898180 | A | 1/2007 |
| CN | 103430105 | A | 12/2013 |
| CN | 110323026 | A | 10/2019 |
| JP | 2011-164224 | A | 8/2011 |
| JP | 2011-209475 | A | 10/2011 |
| JP | 2013178414 | A | 9/2013 |
| JP | 2015-200872 | A | 11/2015 |
| JP | 2017021195 | A | 1/2017 |
| JP | 2017097252 | A | 6/2017 |
| JP | 2018163196 | | 10/2018 |
| WO | WO 2016/143646 | A1 | 9/2016 |
| WO | WO-2019/198304 | A1 | 10/2019 |

OTHER PUBLICATIONS

International Search Report for International Application No. PCT/JP2022/021792, dated Aug. 9, 2022, 3 pgs.

* cited by examiner

*Primary Examiner* — Amber R Orlando
*Assistant Examiner* — Charles Collins Sullivan, IV
(74) *Attorney, Agent, or Firm* — Foley & Lardner LLP

(57) ABSTRACT

The present invention provides a ferrite particle containing: a ferrite particle body having a spinel crystal structure belonging to a space group Fd-3m and having a spinel composition represented by the following formula (1); and a coating layer having a spinel crystal structure belonging to the space group Fd-3m and coating a surface of the ferrite particle body, in which the coating layer is a layer obtained by subjecting the ferrite represented by the following formula (1) to a heat treatment, and a content ratio of the coating layer in the ferrite particle obtained by subjecting a powder X-ray diffraction pattern to Rietveld analysis is 5 mass % or more and 35 mass % or less, and the ferrite particle satisfies a specific formula (2). The present invention also provides a carrier for an electrophotographic developer.

20 Claims, No Drawings

FERRITE PARTICLE, CARRIER FOR ELECTROPHOTOGRAPHIC DEVELOPER, ELECTROPHOTOGRAPHIC DEVELOPER, AND METHOD FOR PRODUCING FERRITE PARTICLE

CROSS REFERENCE TO RELATED APPLICATIONS

The present application claims priority under 35 U.S.C. § 371 to International Patent Application No. PCT/JP2022/021792 filed May 27, 2022. which claims priority to and the benefit of Japanese Patent Application No. 2021-08976. filed May 28, 2021. The contents of these applications are hereby incorporated by reference in their entireties.

TECHNICAL FIELD

The present invention relates to a ferrite particle, a carrier for an electrophotographic developer, an electrophotographic developer, and a method for producing a ferrite particle.

BACKGROUND ART

An electrophotographic developing method refers to a method in which a toner in a developer is adhered to an electrostatic latent image formed on a photoreceptor to develop the electrostatic latent image. The developer used in this method is divided into a two-component developer composed of a toner and a carrier and a one-component developer using only a toner. As a developing method using a two-component developer, a cascade method or the like was adopted in the past, but a magnetic brush method using a magnet roll is currently the mainstream.

In the magnetic brush method, a toner and a carrier are stirred and mixed in a developing box filled with a developer, thereby imparting an electric charge to the toner. Then, the carrier is conveyed to a surface of a photoreceptor by a developing roll that holds a magnet. At this time, the charged toner is conveyed to the surface of the photoreceptor by the carrier. After a toner image is formed on the photoreceptor by an electrostatic action, the carrier remaining on the developing roll is collected again into the developing box, stirred and mixed with a new toner, and repeatedly used for a certain period of time.

In recent years, in order to develop an electrostatic latent image with high definition, a particle diameter of the toner has been reduced. With the reduction in the particle diameter of the toner, a particle diameter of the carrier is also reduced. By reducing the particle diameter of the carrier, a mechanical stress at the time of stirring and mixing the carrier and the toner is reduced, and occurrence of toner spent or the like can be suppressed. Therefore, a service life of the developer is extended as compared with the conventional art. However, in a case where the particle diameter of the carrier is reduced, carrier scattering easily occurs, and image defects such as white spots easily occur.

For example, Patent Literature 1 discloses a carrier core material containing 15 wt % to 22 wt % of Mn, 0.5 wt % to 3.0 wt % of Mg, 45 wt % to 55 wt % of Fe, and 0.1 wt % to 3.0 wt % of Sr, having a lattice constant of 8.430 to 8.475, and having a surface oxide film formed thereon. According to the carrier core material disclosed in Patent Literature 1, by providing the surface oxide film, the particle resistance is high regardless of whether the particle diameter is small, and the variation in resistance between particles can be reduced. Therefore, when the carrier core material is used in an electrophotographic developer, beads carry over can be suppressed, and a good printed matter having excellent fine line reproducibility can be obtained.

In addition, Patent Literature 2 discloses a carrier core material represented by a composition formula $M_XFe_{3-X}O_4$ (where M is at least one metal selected from the group consisting of Mn, Mg, Ca, Sr, Ti, Cu, Zn, and Ni, and $0<X\leq1$), in which a half width calculated based on a peak of a plane index (311) in a powder X-ray diffraction pattern is 0.15° or more and less than 0.20°, and through pulverization of the carrier core material, a difference in lattice constant calculated based on a peak of the plane index (311) in the powder X-ray diffraction pattern before and after pulverization is 0.005 Å or less in absolute value. It is also disclosed that oxidation proceeds not only to the surface of the particle but also to the inside of the particle to increase the resistance of the carrier core material, and that when the carrier core material is used as an electrophotographic developer, beads carry over to a photoreceptor or the like is suppressed.

PRIOR ART DOCUMENTS

Patent Literatures

Patent Literature 1: JP2013-178414A
Patent Literature 2: JP2017-21195A

SUMMARY OF INVENTION

Object to be Achieved by the Invention

Incidentally, in a case of a two-component developer, manufacturing conditions are precisely controlled so that magnetization and resistance of the carrier core material become predetermined initial setting values in accordance with properties of a developing device using an electrophotographic developer and properties of a toner. However, in the conventional carrier core material, the resistance value generally varies depending on humidity or the like in an atmosphere. That is, the resistance value indicates environmental dependence. The conventional carrier core material is composed of particles having small variation in resistance and the like. Therefore, a resistance change of a powder body exhibits substantially the same behavior as a resistance change of each particle. Therefore, image printing can be performed with extremely high image quality under a predetermined atmosphere condition. However, in a case where environmental changes such as a rapid change in atmospheric temperature and a change in humidity occur, the resistance value and the toner charge amount vary, and the toner and the carrier may not be stirred and mixed satisfactorily. In such a case, charge rising may be delayed, and density unevenness may occur due to variation in the toner charge amount in an initial stage of printing.

In addition, when the surface or the like of the ferrite particle is oxidized as in the carrier core material described in Patent Literature 1 and Patent Literature 2, in a case where there is a portion which is not sufficiently oxidized, the portion may be oxidized over time, and the resistance of the carrier core material may change over time.

Further, in the developing device, an image density of a printed matter is detected, and a concentration is controlled so that the toner charge amount becomes an appropriate value. Here, the toner charge amount tends to be high in a low-temperature and low-humidity environment and low under high temperature and high humidity. In addition, in a two-component developer containing a toner and a carrier, the toner charge amount tends to be low in a case where the toner concentration is high in a mixing ratio of the toner and the carrier, and the toner charge amount tends to be high when the toner concentration is low. Accordingly, in a case where an image or the like is printed in a low-temperature and low-humidity environment, the toner charge amount tends to be high, and therefore, the image density decreases. Therefore, in order to reduce the toner charge amount in the developing device, the toner is replenished to a developer box to control the toner concentration to be high. On the other hand, in a case where an image or the like is printed under high temperature and high humidity, the toner charge amount tends to decrease as described above, and therefore, the image density increases. Therefore, control such as stopping replenishment of toner until the toner charge amount falls within an appropriate range is performed in the developing device.

However, there is a period in which the developing device is not used for a long period in a state where the toner concentration is controlled to be high in a low-temperature and low-humidity environment, and there may be a case where the atmosphere is changed from a low-temperature and low-humidity environment to a high-temperature and high-humidity environment when an image or the like is next printed. In this case, the toner charge amount varies greatly, and the toner and the carrier may not be stirred and mixed satisfactorily. As a result, the rise of the toner charge amount may be delayed, variation in the toner charge amount may occur, and image defects such as occurrence of density unevenness may occur in the printed matter.

In addition, the carrier core material disclosed in Patent Literature 1 and Patent Literature 2 have a small variation in magnetization and is assumed to be a powder including particles having the same degree of magnetization. While the developing device is not used for a long period of time, the carrier particle may aggregate by magnetic force. Therefore, in a case where printing is performed after a long unused period, it is necessary to first loosen aggregation of the carrier particle at the time of stirring and mixing the toner and the carrier in the initial stage of printing. In particular, as the magnetization distribution is narrower and the magnetization is higher, the carrier particle are more likely to aggregate and a magnetic coupling force between the particles is stronger. For example, in a developing device capable of high-speed printing at a continuous image forming speed of 100 sheets/min or more, a stirring speed and a mixing speed of the toner and the carrier are high, and a torque required to loosen magnetic coupling between the particles is small. However, in a medium-to-low speed developing device in which the continuous image forming speed is 40 sheets/min or less, the stirring speed and the mixing speed become slow. Therefore, a torque required to loosen the magnetic coupling between the particles becomes large, and it is difficult to satisfactorily mix the toner and the carrier, and thus it may be difficult to implement a sufficient image density or the like in the initial stage of printing.

Therefore, an object of the present invention is to provide a ferrite particle suitable for a carrier core material for an electrophotographic developer, which is excellent in stirring property and mixing property between a toner and a carrier and which can suppress occurrence of an image defect in an initial stage of printing even when an environment is varied, a carrier for an electrophotographic developer, an electrophotographic developer, and a method for producing a ferrite particle.

Means for Achieving the Object

The present invention includes the following aspects.

[1]

A ferrite particle including:

a ferrite particle body having a spinel crystal structure belonging to a space group Fd-3m and having a spinel composition represented by the following formula (1); and a coating layer having a spinel crystal structure belonging to the space group Fd-3m and coating a surface of the ferrite particle body, in which the coating layer is a layer obtained by subjecting the ferrite represented by the following formula (1) to a heat treatment, and a content ratio of the coating layer in the ferrite particle obtained by subjecting a powder X-ray diffraction pattern to Rietveld analysis is 5 mass % or more and 35 mass % or less, and the ferrite particle satisfies the following formula (2):

$$Mg_xMn_{(1-x)}Fe_2O_4 \quad (1)$$

$$0.040\ Å \le D_{LC} \le 0.070\ Å \quad (2)$$

where in the formula (1), $0.001 \le x < 0.300$, and in the formula (2), $D_{LC}$=(lattice constant of the ferrite particle body)−(lattice constant of the coating layer).

[2]

The ferrite particle according to [1], in which a half width of a (311) plane in a powder X-ray diffraction pattern of the ferrite particle is 0.25° or more and 0.35° or less.

[3]

The ferrite particle according to [1] or [2], in which when a total substance amount of Fe, Mn, and Mg contained in the ferrite particle is defined as 100 mol, an Sr element is contained in an amount of 0.4 mol or more and 1.2 mol or less in addition to those spinel crystal constituent elements.

[4]

The ferrite particle according to any one of [1] to [3], in which saturation magnetization by B-H measurement at the time of applying a magnetic field of 3K·1000/4π·A/m is 50 $Am^2/kg$ or more and 75 $Am^2/kg$ or less.

[5]

The ferrite particle according to any one of [1] to [4], in which an apparent density is 2.23 $g/cm^3$ or more and 2.35 $g/cm^3$ or less, and a surface roughness Rz is 2.5 μm or more and 3.5 μm or less.

[6]

The ferrite particle according to any one of [1] to [5], in which a BET specific surface area is 0.070 $m^2/g$ or more and 0.150 $m^2/g$ or less.

[7]

A carrier for an electrophotographic developer, including:

the ferrite particle according to any one of [1] to [6]; and a resin coating layer which coats a surface of the ferrite particle.

[8]

An electrophotographic developer, including:

the carrier for an electrophotographic developer according to [7]; and a toner.

[9]

The electrophotographic developer according to [8], which is used as a replenishment developer.

[10]

A method for producing the ferrite particle according to [1] to [6], including:

a step of obtaining a mixture by mixing an Fe raw material containing Fe, an Mn raw material containing Mn, and an Mg raw material containing Mg in predetermined amounts;

a step of obtaining a granulated product by using the mixture;

a step of obtaining a sintered product by sintering, using a closed type atmosphere heat treatment furnace including a closed type heat treatment chamber capable of controlling a sintering atmosphere and a cooling chamber capable of controlling a cooling atmosphere to an atmosphere different from the sintering atmosphere, the granulated product in the closed type heat treatment chamber;

a cooling step of cooling the sintered product to 250° C. or lower in the cooling chamber whose atmospheric oxygen concentration is controlled to less than 0.3 vol % without bringing the sintered product into contact with the outside air; and a step of subjecting the sintered product after the cooling step to a surface heat treatment.

[11]

The method for producing a ferrite particle according to [10], in which the surface heat treatment is performed using a rotary furnace, and the following formula (3) is satisfied when an inner diameter of a rotary incineration chamber of the rotary furnace is denoted by L (m), a rotation speed is denoted by X (rpm), and a surface heat treatment time is denoted by t (min).

$$20 \le L\pi Xt \le 60 \quad (3)$$

[12]

The method for producing a ferrite particle according to [10] or [11], in which a blending ratio of the Fe raw material, the Mn raw material, and the Mg raw material in the mixture satisfies the following formula (4):

$$0.80 \le n_{Fe}/(n_{Mn} + n_{Mg}) < 2.00 \quad (4)$$

where $n_{Fe}$: substance amount (mol %) of Fe element in the Fe raw material $n_{Mn}$: substance amount (mol %) of Mn element in the Mn raw material $n_{Mg}$: substance amount (mol %) of Mg element in the Mg raw material

Effects of Invention

According to the present invention, it is possible to provide a ferrite particle suitable for a carrier core material of an electrophotographic developer, which has magnetic distribution suitable for medium-to-low speed printing and which is capable of implementing good image properties, a carrier for an electrophotographic developer, an electrophotographic developer, and a ferrite particle production method.

EMBODIMENTS FOR CARRYING OUT THE INVENTION

Hereinafter, an embodiment of a ferrite particle, a carrier core material for an electrophotographic developer, a carrier for an electrophotographic developer, and an electrophotographic developer according to the present invention will be described. First, an embodiment of a ferrite particle and a carrier core material for an electrophotographic developer will be described. In the present description, the ferrite particle, the carrier core material for an electrophotographic developer, the carrier for an electrophotographic developer, and the electrophotographic developer each mean an aggregate of individual particles, that is, a powder, unless otherwise specified.

Hereinafter, the ferrite particle according to the present embodiment will be described as being used as a carrier core material for an electrophotographic developer, but the ferrite particle according to the present invention can be used in various applications such as a magnetic ink, a magnetic fluid, various functional fillers such as a magnetic filler, a filler for a bonded magnet, and a filler for an electromagnetic wave shielding material, and an electronic component material, and the application of the ferrite particle is not limited to a carrier core material for an electrophotographic developer.

1. Ferrite Particle

First, the ferrite particle will be described. The ferrite particle includes a ferrite particle body having a spinel crystal structure belonging to a space group Fd-3m and having a spinel composition represented by the following formula (1), and a coating layer having a spinel crystal structure belonging to the space group Fd-3m and coating a surface of the ferrite particle body, in which the coating layer is a layer obtained by subjecting the ferrite represented by the following formula (1) to a heat treatment, and a content ratio of the coating layer in the ferrite particle obtained by subjecting a powder X-ray diffraction pattern to Rietveld analysis is 5 mass % or more and 35 mass % or less, and the ferrite particle satisfies the following formula (2):

$$Mg_xMn_{(1-x)}Fe_2O_4 \quad (1)$$

$$0.040\ \text{Å} \le D_{LC} \le 0.070\ \text{Å} \quad (2)$$

where in the formula (1), $0.001 \le x < 0.300$, and in the formula (2), $D_{LC}$=(lattice constant of the ferrite particle body)−(lattice constant of the coating layer).

The spinel crystal structure belonging to the space group Fd-3m belongs to a cubic system, and a unit lattice thereof is represented by $8(AB_2O_4)$. Here, "A" in $(AB_2O_4)$ represents an element (metal ion) disposed at a position 8b (site A) which is a center position of a tetrahedron constituted by four oxygen atoms, and "B" represents an element disposed at a position 16c (site B) which is a center position of a hexahedron constituted by six oxygen atoms.

In the ferrite having the spinel composition represented by the above formula (1), Mg, Mn, and Fe are disposed as divalent or trivalent ions at the respective lattice points, and as the occupancy rate of $Fe^{3+}$ at each lattice point is higher, the magnetization is stronger. On the other hand, in a case where the Mn occupancy rate at each lattice point increases, the occupancy rate of $Fe^{3+}$ at each lattice point decreases by that amount, resulting in low magnetization. When the lattice constant is measured by a method to be described later, the lattice constant exhibits a smaller value as the occupancy rate of $Fe^{3+}$ increases, and the lattice constant exhibits a larger value as the occupancy rate of Mn at each lattice point increases.

Here, in producing the ferrite represented by the general formula "$AB_2O_4$", in a case where the raw materials are mixed in a state where the blending amount of the raw material for an A-site atom (hereinafter, referred to as an A-site raw material) is large with respect to a stoichiometric amount in accordance with the composition formula, that is, in a case where the A-site raw material is blended in a state richer than the stoichiometric amount, the ferrite having a high occupancy rate of the A-site atom at each lattice point is obtained. For example, in the present invention, in a case where the respective raw materials are mixed so as to satisfy the formula (4) to be described later for Mn which is the A-site atom, an Mn-rich ferrite in which the blending amount of the Mn raw material is larger than a stoichiometric amount in accordance with the composition formula represented by the formula (1) is obtained. At this time, the Mn occupancy rate at each lattice point is increased, and a ferrite having a low occupancy rate of $Fe^{3+}$ at each lattice point is obtained. The lattice constant of the ferrite produced by this method is approximately 8.500 Å or more. Therefore, in the present description, a ferrite having a spinel composition represented by the formula (1) and having a lattice constant of 8.500 Å or more is referred to as an A-rich ferrite for convenience. In addition, a ferrite having a spinel composition represented by the formula (1) and a lattice constant of less than 8.500 Å is referred to as a B-rich ferrite for convenience. The B-rich ferrite is obtained by producing a ferrite in a state where the blending amount of the Fe raw material is large relative to the stoichiometric amount in accordance with the above formula (1), that is, so that a value of the formula (4) to be described later is 2.00 or more. The formula (4) will be described later.

It is considered that in a case where the ferrite having the spinel composition represented by the formula (1) is subjected to a heat treatment, the following reaction occurs.

$$3(Mg_x, Mn_{(1-x)})Fe_2O_4 \longrightarrow (1-x)Mn_3O_4 + 3xMgFe_2O_4 + 2(1-x)Fe_3O_4$$

Here, the lattice constants of the compounds in the above reaction formula are shown below. The following lattice constants are values described in the respective literatures.

$MnFe_2O_4$: 8.510 Å

(Source: Phys. Status Solidi A, 1993, 139, K109-K112, Latha K., Ravinder D.)

$MgFe_2O_4$: 8.374 Å

(Source: J. Magn. Magn. Mater., 1992, 110, 147-150, Patil S. H., Patil S. I., Kadam S. M., Chougule B. K.)

$Mn_3O_4$: 8.565 Å

(Source: Russ. J. Inorg. Chem., 1990, 35, 877-881, Zinovik M. A.)

$Fe_3O_4$: 8.395 Å

(Source: J. Phys. Soc. Jpn., 1995, 64, 3484-3495, Okamura A., Nakamura S., Tanaka M., Siratori K.)

Assuming that the coating layer is a composite of $Mn_3O_4$, $MgFe_2O_4$, and $Fe_3O_4$, the lattice constant of the coating layer is, for example, about 8.451 Å when x=0.001.

Therefore, when a decomposition reaction occurs in the A-rich ferrite by the heat treatment, a change in lattice constant before and after the decomposition reaction becomes large. On the other hand, even when a decomposition reaction occurs in the B-rich ferrite by the heat treatment, the amount of $Mn_3O_4$ generated is small, or almost no $Mn_3O_4$ is generated, and the amount of $Fe_3O_4$ generated is large. Since a difference between the lattice constant of the ferrite before the heat treatment and the lattice constant of $Fe_3O_4$ generated by the heat treatment is small, the change in the lattice constant before and after the heat treatment is small in the B-rich ferrite.

Therefore, when the ferrite particle body is an A-rich ferrite, the value of the formula (2) is an index indicating a degree of the heat treatment performed on the surface. That is, a lattice constant difference $D_{LC}$ between the ferrite particle body and the coating layer within the range of the above formula (2) indicates a state where the ferrite particle is covered with a composite of $Mn_3O_4$, $MgFe_2O_4$, and $Fe_3O_4$ and the surface of the ferrite particle is sufficiently subjected to heat treatment.

On the other hand, when the ferrite particle body is a B-rich ferrite, the change in the lattice constant before and after the heat treatment is small, and therefore, the value of the formula (2) is not an index indicating presence or absence or the degree of the heat treatment on the surface. In addition, when the ferrite particle body is a B-rich ferrite, the surface is sufficiently subjected to heat treatment, and even when the surface is decomposed as described above, the difference in lattice constant between the ferrite particle body and the coating layer is small, and therefore, it is difficult to satisfy the formula (2).

As described above, when the formula (2) is satisfied, it indicates that the ferrite particle body is an A-rich ferrite, the surface thereof is sufficiently subjected to heat treatment, and a coating layer having a uniform thickness is provided.

Further, it is found that the following effects are exerted when a content ratio of the coating layer in the ferrite particle, which is obtained by subjecting the powder X-ray diffraction pattern in the ferrite particle satisfying the formula (1) and the formula (2) to Rietveld analysis, is 5 mass % or more and 35 mass % or less.

First, when the ferrite particle body is an A-rich ferrite, the Mn occupancy rate at each lattice point is relatively high as described above, and the ferrite tends to have low magnetization. Therefore, as compared with a ferrite in which the ferrite particle body is a B-rich ferrite, that is, the $Fe^{3+}$ occupancy rate at each lattice point is high, the magnetization of the ferrite particle can be prevented from being extremely high when viewed as a powder. Therefore, the ferrite particle according to the present invention exhibits suitable magnetism when adopted as a carrier core material of an electrophotographic developer for a medium-to-low speed developing device. In addition, a variation occurs in an occupied state of each lattice point in the case of the A-rich ferrite as compared with the B-rich ferrite, and therefore, a variation occurs in the magnetization of each particle constituting the powder body. Therefore, particles having different magnetization are more likely to be magnetically coupled to each other than particles having the same degree of magnetization in the powder. It is easier to loosen magnetic coupling between the particles having different magnetization than to loosen magnetic coupling between the particles having the same degree of magnetization. As a result, by using the ferrite particle as a carrier core material, it is easy to loosen the magnetic coupling between the carriers, mixing and stirring of the toner and the carrier can be rapidly performed, and a carrier having high image responsiveness capable of implementing a sufficient image density or the like even in the initial stage of printing can be obtained.

Further, it is understood that when the content ratio of the coating layer in the ferrite particle obtained by subjecting the powder X-ray diffraction pattern to Rietveld analysis is 5 mass % or more and 35 mass % or less, the surface of the ferrite particle body is entirely covered with the coating layer by a sufficient thickness. When a spinel ferrite ($AB_2O_4$) is generated by sintering, an oxygen-deficient spinel crystal structure ($AB_2O_{4-\alpha}$) may be formed under a low-oxygen atmosphere. In a case where an oxygen-deficient spinel crystal is generated, the ferrite is oxidized over time when being in contact with oxygen in the atmosphere, and the surface resistance value increases over time. In a case where the content ratio of the coating layer in the ferrite particle is within the above range, the surface of the ferrite particle body is sufficiently covered with the coating layer, and therefore, exposure of the ferrite particle body can be suppressed. Therefore, even in a state where the surface of the ferrite particle body is easily oxidized, contact between the ferrite particle body and oxygen in the atmosphere can be suppressed by the coating layer, and oxidation of the ferrite particle body can be prevented. Therefore, it is possible to prevent the surface resistance from changing over time.

Hereinafter, the ferrite particle according to the present invention will be described in more detail.

(1) Lattice Constant Difference ($D_{LC}$)

The lattice constant difference ($D_{LC}$) between the ferrite particle body and the coating layer is as described above. Here, each lattice constant is a value specified by subjecting, to Rietveld analysis as follows, the powder X-ray diffraction pattern obtained by measurement as follows by a powder X-ray diffraction method.

(Powder X-Ray Diffraction)

As an X-ray diffractometer, "X'Pert PRO MPD" manufactured by PANalytical Corporation can be used. A Co tube (CoKα ray) can be used as an X-ray source. A focused optical system and a high-speed detector "X'Celarator" can be used as an optical system. Measurement conditions are as follows.

Scanning speed: 0.08°/sec
Divergence slit: 1.0°
Scattering slit: 1.0°
Receiving slit: 0.15 mm
Voltage and current values of enclosing tube: 40 kV/40 mA
Measurement range: 2θ=15° to 90°
Integration number: 5 times (Crystal Structure Analysis and Qualitative Analysis)

The crystal structure is assumed as follows from a structure disclosed in "National Research and Development Agency, National Institute for Materials Science, "AtomWork", Internet <URL: http://crystdb.nims.go.jp/> based on the powder X-ray diffraction pattern obtained as described above, and the lattice constant is specified from each crystal structure.

Ferrite particle body: crystal phase composed of manganese ferrite (spinel crystal)

Crystal structure: space group Fd-3m (No. 227)

<Atomic Coordinate>

| | | | |
|---|---|---|---|
| Mn: 8b | 3/8 | 3/8 | 3/8 |
| Fe: 16c | 0 | 0 | 0 |
| O: 32e | x | x | x |

Coating layer: crystal phase composed of manganese ferrite (spinel crystal)

Crystal structure: space group Fd-3m (No. 227)

<Atomic Coordinate>

| | | | |
|---|---|---|---|
| Mn: 8b | 3/8 | 3/8 | 3/8 |
| Fe: 16c | 0 | 0 | 0 |
| O: 32e | x | x | x |

After the crystal structures of the ferrite particle body and the coating layer are assumed as described above, the following parameters are optimized using analysis software "RIETAN-FP u2.83". As a profile function, the pseudo-Voigt function of Thompson, Cox, Hasting is used, and asymmetrization is performed by the Howard method. In addition, the following parameters are refined so that an Rwp value and an S value representing fitting accuracy are 2% or less and 1.5 or less, respectively.

(Parameters for Refinement)

Shift factor
Scale factor
Background parameter
Gaussian function U, V, and W
Lorentz function X and Y
Asymmetry parameter As
Lattice constant·oxygen atomic coordinate When the lattice constant difference ($D_{LC}$) calculated from the lattice constants of the ferrite particle body and the coating layer obtained as described above is within the above-described range, the above-described effects are exerted. In order to exert the effects, an upper limit of the lattice constant difference ($D_{LC}$) is preferably less than 0.070 Å, more preferably 0.065 Å, still more preferably 0.060 Å, and yet still more preferably 0.055 Å.

(2) Content Ratio of Coating Layer (Rietveld Analysis)

The powder X-ray diffraction pattern obtained as described above is subjected to Rietveld analysis in the same manner as described above, and a proportion of a compound having a lattice constant different from that of the ferrite particle body is defined as the content ratio of the coating layer based on an existence ratio of each crystal phase in terms of mass.

In a case where the content ratio of the coating layer obtained as described above is within the above range, the change in the surface resistance value of the carrier over time can be suppressed when the ferrite particle is used as the carrier core material of the electrophotographic developer as described above. In order to exert the effect, a lower limit of the content ratio of the coating layer is more preferably 10 mass %. An upper limit thereof is preferably less than 35 mass %, more preferably 30 mass %, still more preferably 25 mass %, and yet still more preferably 20 mass %.

(3) Half Width

A half width of the (311) plane of the ferrite particle is preferably 0.25° or more and 0.35° or less. Here, the half width is a full width at half maximum (FWHM) due to diffraction of Kα1 rays in the (311) plane described in an analysis result (**.1st) by subjecting the powder X-ray diffraction pattern obtained as described above to Rietveld analysis in the same manner as described above. In the conventional art, there has been a demand for a ferrite particle having a uniform crystal structure and a narrow magnetization distribution as a ferrite particle used for a carrier core material. However, by using a ferrite particle having a variation in crystal structure while adopting the A-rich ferrite as described above as the carrier core material, the variation occurs in the magnetization of each particle, and the above-described effect is exerted. In order to implement an electrophotographic developer having high image density responsiveness, the half width is preferably within the above range.

In order to exert the effect, a lower limit of the half width is more preferably larger than 0.25°, still more preferably 0.27°, and yet still more preferably 0.29°. An upper limit of the half width is more preferably smaller than 0.35°, still more preferably 0.33°, and yet still more preferably 0.31°

(4) x

"x" in the above formula (1) is a value obtained by quantifying elements contained in the ferrite particle by ICP emission spectrometry. The value of "x" is obtained as follows.

(ICP)

First, 0.2 g of the ferrite particle to be measured is weighed. Then, 20 ml of IN hydrochloric acid and 20 ml of IN nitric acid are added to 60 ml of pure water, followed by heating, and the ferrite particle is added thereto to prepare an aqueous solution in which the ferrite particle is dissolved. The aqueous solution is used as a specimen, and the contents of Fe, Mn, and Mg can be measured using an ICP emission spectrometer (ICPS-1000IV manufactured by Shimadzu Corporation), and the value of "x" in the above formula (1) can be obtained based on the measured values.

Here, as described above, $0.001 \leq x < 0.300$. A lower limit of "x" is more preferably 0.050. An upper limit of "x" is more preferably 0.200.

(5) Sr Content

When the total amount of Fe, Mn, and Mg contained in the ferrite particle is defined as 100 mol, it is preferable to contain the Sr element in an amount of 0.4 mol or more and 1.2 mol or less in addition to the spinel crystal constituent elements. The Sr content can be measured by the same method as the value of "x".

Specifically, the measurement is performed as follows. Sr is dissolved in the aqueous solution prepared when the value of "x" is measured by the ICP emission spectrometry. Therefore, when the contents of Fe, Mn, and Mg are measured using the aqueous solution, the content of the Sr element is also measured at the same time, a substance amount (mol) of "Sr" when the total substance amount (mol) of "Fe", "Mn", and "Mg" is defined as 100 is determined, and the value is defined as the content (mol) of Sr.

When Sr is contained in this range, the unevenness of the surface of the ferrite particle can be made to have an appropriate size, variation in unevenness can be suppressed, and peeling or the like of the resin coating layer when carriers collide with each other can be suppressed. In addition, when the unevenness of the surface of the ferrite particle becomes an appropriate size and the surface thereof is coated with a resin to form a carrier, the resistance can be prevented from becoming extremely high. On the other hand, in a case where the Sr content exceeds the above range, chlorine released from the Fe raw material or the like at the time of sintering or the like is adsorbed to an Sr compound precipitated on a surface of the core material, and the charging properties of the ferrite particle are easily affected by the atmospheric humidity. Therefore, the surface resistance of the ferrite particle may decrease in a high-temperature and high-humidity environment, and the chargeability may also decrease. Regarding "containing an Sr element in addition to the spinel crystal constituent elements", the Sr element is not an element that constitutes the spinel crystal structure, further is not an element that constitutes ferrite having other crystal structures, such as Sr ferrite, and means to be present in the particle.

In order to exert the effect, a lower limit of the "Sr" content is more preferably larger than 0.4 mol, still more preferably 0.5 mol, and yet still more preferably 0.6 mol. An upper limit thereof is more preferably smaller than 1.2 mol, still more preferably 1.1 mol, and yet still more preferably 1.0 mol.

(6) Magnetic Property

Next, the magnetic property of the ferrite particle will be described. The ferrite particle preferably has saturation magnetization of 50 $Am^2/kg$ or more and 75 $Am^2/kg$ or less by B-H measurement at the time of applying a magnetic field of $3K \cdot 1000/4\pi \cdot A/m$. In a case where the saturation magnetization of the ferrite particle is within the range, it is easy to loosen magnetic coupling between particles, for example, even in a medium-to-low speed developing device in which the image forming speed is 40 sheets/min or less, and even when there is a long unused period, the stirring of the toner and the carrier can be satisfactorily performed regardless of the change in the atmospheric temperature and the humidity therebetween, and the rise of the toner charge amount can be promptly performed.

In contrast, in a case where the saturation magnetization is less than 50 $Am^2/kg$, the magnetization becomes extremely low, and the magnetic brush may be insufficiently raised, or the carrier caused by low magnetization is likely to be scattered from the developing roller, and image defects due to low magnetization may occur. In a case where the saturation magnetization exceeds 75 $Am^2/kg$, the magnetic coupling between the particles becomes strong and the fluidity decreases, and therefore, it is difficult to satisfactorily stir the toner and the carrier in the medium-to-low speed developing device as described above, and the rise of the toner charge amount may be delayed.

From this viewpoint, a lower limit of the saturation magnetization is more preferably larger than 50 $Am^2/kg$, still more preferably 55 $Am^2/kg$, and yet more preferably 60 $Am^2/kg$.

The saturation magnetization can be measured using an integration-type B-H tracer BHU-60 (manufactured by Riken Denshi Co., Ltd.). Specifically, a specimen is placed in a $4\pi I$ coil, an H coil for magnetic field measurement and a $4\pi I$ coil for magnetization measurement are disposed between electromagnets of the device, outputs of the H coil and the $4\pi I$ coil in which a current of the electromagnet is varied and a magnetic field H is varied are integrated, and a hysteresis loop is drawn on a recording sheet with an H output as an X axis and the output of the $4\pi I$ coil as a Y axis. In this hysteresis curve, the magnetization when the applied magnetic field is $3K \cdot 1000/4\pi \cdot A/m$ is determined and defined as the saturation magnetization. Measurement conditions are as follows.

Specimen filling amount: about 1 g

Specimen filled cell: inner diameter of 7 mm $\varphi \pm 0.02$ mm, height of 10 mm±0.1 mm $4\pi I$ coil: 30 turns (7) Apparent Density (AD)

An apparent density (AD) of the ferrite particle is preferably 2.23 g/cm$^3$ or more and 2.35 g/cm$^3$ or less. The apparent density referred to herein is a value measured in accordance with JIS Z 2504:2012. In a case where the apparent density of the ferrite particle is within the range, the fluidity required for medium-to-low speed printing can be satisfied, and when the ferrite particle is used as a carrier core material for an electrophotographic developer, the carrier and the toner can be satisfactorily stirred in a developing box, and good image density can be stably obtained.

In contrast, in a case where the apparent density (AD) of the ferrite particle is less than 2.23 g/cm$^3$, beads carry over may be caused. On the other hand, in a case where the apparent density (AD) of the ferrite particle exceeds 2.35 g/cm$^3$, the charging properties may be deteriorated due to peeling of a resin coating layer to be described later caused by a stirring stress in the developing box, and the stability of the image density may decrease.

In order to exert these effects, an upper limit of the apparent density of the ferrite particle is preferably less than 2.35 g/cm$^3$, more preferably 2.32 g/cm$^3$, and still more preferably 2.30 g/cm$^3$.

The apparent density can be measured as follows using a powder apparent density meter. As the powder apparent density meter, a powder apparent density meter including a funnel, a cup, a funnel support, a support rod, and a support base is used. A balance having a maximum weight of 200 g and a minimum weight of 50 mg is used. Then, a value obtained by measurement in the following procedure and calculation in the following manner is defined as the apparent density referred to herein.

i) Measurement Method (a) The amount of the specimen is at least 150 g or more.

(b) The specimen is poured into a funnel having an orifice with a hole diameter of 2.5+0.2/−0 mm, and is poured into the cup until the specimen overflows.

(c) Immediately after the specimen starts to overflow, the inflow of the specimen is stopped, and the specimen raised on the cup is flatly scraped off by a scraper along an upper end of the cup so as not to apply a vibration.

(d) A side surface of the cup is lightly tapped to sink the specimen and to remove the specimen attached to the outside of the cup, and the weight of the specimen in the cup is weighed with an accuracy of 0.05 g.

ii) Calculation

A numerical value obtained by multiplying the measured value obtained in the above (d) by 0.04 is rounded to the second place after the decimal point according to JIS-Z 8401 (method of rounding a numerical value), and is defined as the apparent density in the unit of "g/cm$^3$".

(8) Surface Roughness Rz

A surface roughness Rz of the ferrite particle is preferably 2.5 μm or more and 3.5 μm or less. In a case where the surface roughness Rz of the ferrite particle is within the range, the unevenness of the surface of the carrier becomes appropriate when the ferrite particle is used as a carrier core material for an electrophotographic developer, an effective charging area contributing to charging with the toner can be secured, and a good image density can be stably obtained.

From this viewpoint, a lower limit of the surface roughness Rz is more preferably larger than 2.5 μm, still more preferably 2.7 μm, and yet still more preferably 3.0 μm.

The surface roughness Rz can be measured as follows using a laser microscope OPTELICS manufactured by Lasertec Corporation. First, as measurement conditions, a lens magnification of 100 times, an optical zoom of 3.0 times, a measurement pitch of 0.02 μm, and cutoff filters λs=2.5 μm and λf=0.08 mm are adopted. The unevenness of the ferrite particle surface is measured based on the measurement conditions. Then, a range of 10 μm square is designated using the obtained data of the surface shape of the ferrite particle, data is corrected from a spherical surface to a flat surface with the ferrite particle regarded as a true spherical shape, and thereafter, a value calculated in accordance with JIS B0601-2001 is defined as the surface roughness Rz.

It is preferable that in the ferrite particle, the apparent density is 2.23 g/cm$^3$ or more and 2.35 g/cm$^3$ or less, and the surface roughness Rz is 2.5 μm or more and 3.5 μm or less.

(9) BET Specific Surface Area

The BET specific surface area of the ferrite particle is preferably 0.070 m$^2$/g or more and 0.150 m$^2$/g or less. In a case where the BET specific surface area is within the range, an effective charging area of the carrier contributing to charging with the toner can be secured when the ferrite particle is used as a carrier core material for an electrophotographic developer, and a good image density can be stably obtained.

In order to exert these effects, a lower limit of the BET specific surface area of the ferrite particle is preferably larger than 0.070 m$^2$/g, and more preferably 0.080 m$^2$/g. An upper limit thereof is preferably smaller than 0.150 m$^2$/g, more preferably 0.130 m$^2$/g, and still more preferably 0.120 m$^2$/g.

The BET specific surface area can be obtained from a $N_2$ adsorption amount of the carrier particle measured by adsorbing $N_2$ as the adsorption gas using an "automatic specific surface area measuring device GEMINI 2360" (manufactured by Shimadzu Corporation). Here, a measurement tube used for measuring a $N_2$ adsorption amount is subjected to empty sintering at 50° C. for 2 hours in a depressurized state before the measurement. Further, 5 g of the carrier particle are filled into the measurement tube, a pretreatment is performed at a temperature of 30° C. for 2 hours in a depressurized state, and thereafter, a $N_2$ gas is adsorbed at 25° C. to measure an adsorption amount thereof. The adsorption amount is a value calculated based on a BET equation by drawing an adsorption isotherm.

(10) Average Volume Particle Diameter ($D_{50}$)

The average volume particle diameter ($D_{50}$) of the ferrite particle is preferably 20 μm or more and 80 μm or less. In a case where the volume average particle diameter ($D_{50}$) of the ferrite particle falls within the range, a ferrite particle suitable for various applications can be obtained.

In addition, in a case where the ferrite particle is used as a carrier core material for an electrophotographic developer, the volume average particle diameter ($D_{50}$) of the ferrite particle is preferably 25 μm or more and 50 μm or less. Within this range, it is possible to prevent the occurrence of variation in image development amount while suppressing beads carry over.

The average volume particle diameter ($D_{50}$) referred to herein refers to a value measured by a laser diffraction and scattering method in accordance with JIS Z 8825: 2013. Specifically, the volume average particle diameter ($D_{50}$) can be measured as follows by using a Microtrac particle size analyzer (Model 9320-X100), manufactured by Nikkiso Co., Ltd. First, the ferrite particle to be measured is used as a specimen, 10 g of the specimen and 80 ml of water are placed in a 100 ml beaker, 2 drops to 3 drops of a dispersant (sodium hexametaphosphate) are added thereto, followed by performing dispersion for 20 seconds by using an ultrasonic homogenizer (UH-150, manufactured by SMT Co., LTD.) with an output level of 4 to remove bubbles formed on a surface of the beaker, thereby preparing a sample, and a volume average particle diameter of the sample measured by the Microtrac particle size analyzer by using this sample is defined as the average volume particle diameter ($D_{50}$) of the specimen.

2. Carrier for Electrophotographic Developer

Next, the carrier for an electrophotographic developer according to the present invention will be described. The carrier for an electrophotographic developer according to the present invention includes the ferrite particle and the resin coating layer that coats the surface of the ferrite particle. That is, the ferrite particle is used as a carrier core material for an electrophotographic developer. Since the ferrite particle as the carrier core material for an electrophotographic developer is as described above, the resin coating layer will be mainly described here.

(1) Type of Coating Resin

A type of a resin (coating resin) constituting the resin coating layer is not particularly limited. For example, a fluorine resin, an acrylic resin, an epoxy resin, a polyamide resin, a polyamide-imide resin, a polyester resin, an unsaturated polyester resin, a urea resin, a melamine resin, an alkyd resin, a phenol resin, a fluorine acrylic resin, an acryl-styrene resin, or a silicone resin can be used. In addition, a modified silicone resin obtained by modifying a silicone resin or the like with a resin such as an acrylic resin, a polyester resin, an epoxy resin, a polyamide resin, a polyamide-imide resin, an alkyd resin, a urethane resin, or a fluorine resin may be used. For example, the coating resin is preferably a thermosetting resin from the viewpoint of preventing resin peeling due to a mechanical stress received during stirring and mixing with a toner. Examples of the thermosetting resin suitable for the coating resin include an epoxy resin, a phenol resin, a silicone resin, an unsaturated polyester resin, a urea resin, a melamine resin, an alkyd resin, and a resin containing these resins. However, as described above, the type of the coating resin is not particularly limited, and an appropriate coating resin can be appropriately selected according to the type of the toner to be combined, the use environment, and the like.

In addition, the resin coating layer may be formed by using one type of resin, or the resin coating layer may be formed by using two or more types of resins. In a case where two or more types of resins are used, one resin coating layer may be formed by mixing two or more types of resins, or a plurality of resin coating layers may be formed. For example, it is also preferable that a first resin coating layer having good adhesion to the ferrite particle is provided on the surface of the ferrite particle, and a second resin coating layer for imparting desired charge imparting property to the carrier is provided on a surface of the first resin coating layer.

(2) Resin Coating Amount

An amount of the resin that coats the surface of the ferrite particle (resin coating amount) is preferably 0.1 mass % or more and 10 mass % or less with respect to the ferrite particle used as the core material. In a case where the resin coating amount is less than 0.1 mass %, it is difficult to sufficiently coat the surface of the ferrite particle with the resin, and it may be difficult to obtain a desired charge imparting ability. In addition, in a case where the resin coating amount is more than 10 mass %, aggregation of carrier particle occurs at the time of production, and the fluidity of the developer in an actual machine or the property of the developer such as the charge imparting property to a toner may vary along with a decrease in productivity such as a decrease in yield.

(3) Additive

The resin coating layer may contain an additive such as a conductive agent and a charge control agent for the purpose of controlling the electrical resistance of the carrier, the charge amount, and the charge speed. Examples of the conductive agent include conductive carbon, oxides such as titanium oxide and tin oxide, and various organic conductive agents. However, since the electrical resistance of the conductive agent is low, electric charge leakage is likely to occur in a case where an addition amount of the conductive agent is extremely large. Therefore, a content of the conductive agent is preferably 0.25 mass % or more and 20.0 mass % or less, more preferably 0.5 mass % or more and 15.0 mass % or less, and still more preferably 1.0 mass % or more and 10.0 mass % or less with respect to a solid content of the coating resin.

Examples of the charge control agent include various charge control agents generally used for a toner, and a silane coupling agent. A type of the charge control agent or the coupling agent is not particularly limited, but a charge control agent such as a nigrosine dye, a quaternary ammonium salt, an organic metal complex, or a metal-containing monoazo dye, an aminosilane coupling agent, a fluorine-based silane coupling agent, or the like can be preferably used. A content of the charge control agent is preferably 0.25 mass % or more and 20.0 mass % or less, more preferably 0.5 mass % or more and 15.0 mass % or less, and still more preferably 1.0 mass % or more and 10.0 mass % or less with respect to the solid content of the coating resin.

3. Electrophotographic Developer

Next, an embodiment of the electrophotographic developer according to the present invention will be described. The electrophotographic developer includes the above-described carrier for an electrophotographic developer and a toner.

As the toner constituting the electrophotographic developer, for example, a polymerized toner produced by a polymerization method or a pulverized toner produced by a pulverization method can be preferably used. The toner may contain various additives, and may be any toner as long as it can be used in combination with the carrier as an electrophotographic developer.

A volume average particle diameter ($D_{50}$) of the toner is preferably 2 μm or more and 15 μm or less, and more preferably 3 μm or more and 10 μm or less. In a case where the volume average particle diameter ($D_{50}$) of the toner is within this range, an electrophotographic developer capable of performing high-quality electrophotographic printing can be obtained.

A mixing ratio of the carrier and the toner, that is, a toner concentration is preferably 3 mass % or more and 15 mass % or less. The electrophotographic developer containing the toner at this concentration can easily obtain a desired image density, and can more favorably prevent fogging and toner scattering.

The electrophotographic developer according to the present invention can also be used as a replenishment developer.

In a case where the electrophotographic developer is used as a replenishment developer, the mixing ratio of the carrier and the toner is preferably 2 parts by mass or more and 50 parts by mass or less with respect to 1 part by mass of the carrier.

The electrophotographic developer can be suitably used in various electrophotographic developing devices to which a magnetic brush developing method is applied in which a carrier is attracted and attached to a magnetic drum or the like by a magnetic force to form a brush shape, and the toner is conveyed and is attached to an electrostatic latent image formed on a photoreceptor or the like while applying a bias electric field, thereby forming a visible image. The electrophotographic developer can be used, at the time of applying a bias electric field, not only in an electrophotographic developing device using a DC bias electric field but also in an electrophotographic developing device using an alternating bias electric field in which an AC bias electric field is superimposed on a DC bias electric field.

4. Production Method

Hereinafter, a method for producing the ferrite particle, the carrier core material for an electrophotographic developer, the carrier for an electrophotographic developer, and the electrophotographic developer according to the present invention will be described.

4-1. Ferrite Particle and Carrier Core Material for Electrophotographic Developer The ferrite particle and the carrier core material for an electrophotographic developer according to the present invention can be produced by a general method for producing a ferrite particle used in applications such as a carrier core material for an electrophotographic developer, except that a sintering step and a cooling step are performed by methods to be described later. At this time, a raw material mixing step and a surface heat treatment step are preferably performed by methods to be described later.

The method for producing a ferrite particle according to the present invention is a ferrite particle production method for producing the above ferrite particle, and includes:

- a step of obtaining a mixture by mixing an Fe raw material containing Fe, an Mn raw material containing Mn, and an Mg raw material containing Mg in predetermined amounts;
- a step of obtaining a granulated product by using the mixture;
- a step of obtaining a sintered product by sintering, using a closed type atmosphere heat treatment furnace including a closed type heat treatment chamber capable of controlling a sintering atmosphere and a cooling chamber capable of controlling a cooling atmosphere to an atmosphere different from the sintering atmosphere, the granulated product in the closed type heat treatment chamber;
- a cooling step of cooling the sintered product to 250° C. or lower in the cooling chamber whose atmospheric oxygen concentration is controlled to less than 0.3 vol % without bringing the sintered product into contact with the outside air; and
- a step of subjecting the sintered product after the cooling step to a surface heat treatment.

Hereinafter, the raw material mixing step, the granulated product producing step, the sintering step, the cooling step, a post-cooling step, and the surface heat treatment step will be described in this order.

4-1-1. Raw Material Mixing Step

In the raw material mixing step, the Fe raw material, the Mn raw material, and the Mg raw material are weighed and mixed so that the spinel composition after sintering becomes a desired composition, in order to obtain the ferrite particle body represented by the above formula (1). As the Fe raw material, an iron oxide such as $Fe_2O_3$ can be used. As the Mn raw material, $MnO_2$, $Mn_2O_3$, $Mn_3O_4$, $MnCO_3$, or the like can be used. As the Mg raw material, MgO, $Mg(OH)_2$, $MgCO_3$, or the like can be used. Further, in a case where a ferrite particle containing the Sr element is obtained, an oxide or a carbonate of Sr can be used as a raw material.

Here, in order to obtain the ferrite particle according to the present invention, a blending ratio of the raw materials preferably satisfies the following formula (4).

$$0.80 \leq n_{Fe}/(n_{Mn} + n_{Mg}) < 2.00 \quad (4)$$

where $n_{Fe}$: substance amount (mol %) of Fe element in the Fe raw material $n_{Mn}$: substance amount (mol %) of Mn element in the Mn raw material $n_{Mg}$: substance amount (mol %) of Mg element in the Mg raw material In the formula (4), "$(n_{Mn}+n_{Mg})$" represents a blending amount of the A-site raw material in the general formula "$AB_2O_4$", and "$n_{Fe}$" represents a blending amount of the B-site raw material. By blending the raw materials so as to satisfy the above formula (4), the raw materials are mixed in a state where the blending amount of the A-site raw material is large with respect to a stoichiometric amount in accordance with the above formula (1) as described above, and the lattice constant of the ferrite to be produced becomes approximately 8.500 Å or more. That is, the A-rich ferrite defined above is produced. Therefore, the ferrite particle according to the present invention satisfying the formula (1) and the formula (2) can be satisfactorily produced. In a case where the value of the following formula (4) is 2.00 or more, the raw materials are mixed in a state where a blending amount of the Fe raw material is equal to or larger than the stoichiometric amount corresponding to the formula (1), and the lattice constant of the ferrite to be produced may be less than 8.500 Å. That is, the B-rich ferrite defined above may be produced. Therefore, it may be difficult to obtain a ferrite particle satisfying the formula (1) and the formula (2). On the other hand, in a case where the value of the following formula (4) is less than 0.80, the amount of the Fe raw material becomes extremely small, and the desired saturation magnetization may not be obtained, and beads carry over may easily occur.

After weighing a predetermined amount of the raw materials, the raw materials are pulverized and mixed by a ball mill, a sand mill, a vibration mill or the like in a wet or dry manner for 1 hour or longer, and preferably 1 hour to 20 hours.

4-1-2. Granulated Product Producing Step

Next, water is added to a mixture obtained by pulverizing and mixing the raw materials as described above, followed by finely pulverizing using a bead mill or the like to obtain a slurry. A degree of pulverization can be controlled by adjusting a diameter, a composition, and pulverization time of beads used as a media. In order to uniformly disperse the raw materials, it is preferable to use fine beads having a particle diameter of 1 mm or less as a media. In order to uniformly disperse the raw materials, pulverization is preferably performed so that a volume average particle diameter ($D_{50}$) of a pulverized product is 2.5 μm or less, and more preferably 2.0 μm or less. In addition, in order to suppress abnormal grain growth, pulverization is preferably performed so that a particle diameter ($D_{90}$) on a coarse side of a particle size distribution is 3.5 μm or less. A dispersant, a binder, and the like are preferably added to the slurry thus obtained as necessary to adjust a viscosity thereof to 2 poises or more and 4 poises or less. At this time, polyvinyl alcohol or polyvinyl pyrrolidone can be used as the binder.

The slurry prepared as described above is sprayed by using a spray dryer and dried to obtain a granulated product.

Next, it is preferable to classify the granulated product before sintering to remove fine particles contained in the granulated product in order to obtain a ferrite particle having a uniform particle size. Classification of the granulated product can be performed by using known airflow classification, a sieve, or the like.

Incidentally, in a manufacturing process of the ferrite particle, a calcining step of calcining a mixture of raw materials is generally performed before preparing a slurry. In addition, a so-called binder removing step for removing organic components such as a dispersant and a binder from the granulated product is often provided after the granulated product is obtained. However, in order to produce the ferrite particle according to the present invention, it is preferable not to perform the calcining step or the binder removing step. In a case where these heat treatment steps are performed before the sintering step, the mixture of the raw materials is heated, whereby the ferritization reaction proceeds partially. Therefore, the granulated product includes a seed crystal in which crystallization into a spinel structure partially progresses. In a case where such a granulated product is sintered, crystal growth occurs with the seed crystal as a starting point, and thus internal holes are easily generated in the ferrite particle obtained after the sintering. Therefore, the magnetization of the ferrite particle tends to decrease. In addition, in this case, it is difficult to control the crystal growth of each particle to be equivalent in the sintering step, and variation is likely to occur in the size of the internal hole of each particle. Accordingly, in order to obtain a ferrite particle having a low internal porosity and being used for a carrier core material suitable for high-speed printing containing no particle having low magnetization as compared with other particles, it is not preferable to perform a heat treatment such as a calcining step or a binder removing step on a mixed powder of the raw materials or the granulated product under a condition in which a ferritization reaction may proceed before the sintering step.

4-1-3. Sintering Step

In order to obtain the ferrite particle satisfying the formula (1) and the formula (2), the sintering step is performed as follows.

(1) Sintering Furnace

At the time of performing sintering, a closed type atmosphere heat treatment furnace including a closed type heat treatment chamber capable of controlling a sintering atmosphere and a cooling chamber capable of controlling a cooling atmosphere to an atmosphere different from the sintering atmosphere is used. Examples of the closed type atmosphere heat treatment furnace include a tunnel kiln and an elevator kiln. Since in such a continuous furnace, the granulated product is placed in a refractory container such as a saggar and allowed to pass through a hot portion in a state of being left to stand, the inside of the granulated product can be sufficiently sintered. Therefore, it is easy to obtain a sintered product which has high magnetization and high resistance and in which a spinel crystal phase is sufficiently generated. The sintered product becomes a ferrite particle body.

In addition, by using a closed type atmosphere sintering furnace capable of controlling the atmosphere in the furnace, the inside of the closed type heat treatment chamber can be adjusted to a sintering atmosphere suitable for producing a ferrite particle satisfying the formula (1) and the formula (2), and the sintering atmosphere of individual particles in the refractory container can be easily adjusted to be the same. The sintering atmosphere suitable for producing the ferrite particle satisfying the formula (1) and the formula (2) will be described later.

(2) Sintering Atmosphere

In order to produce the ferrite particle according to the present invention, an oxygen concentration in the sintering atmosphere is preferably an oxygen-free atmosphere less than 0.1 vol % (1,000 ppm). By setting the sintering atmosphere to such an oxygen-free atmosphere, a ferrite particle body satisfying the formula (1) and the formula (2) can be obtained.

(3) Sinter Temperature and the Like

As a sintering temperature and a sintering time, conditions preferable for producing the ferrite particle (ferrite particle body) having an intended spinel composition may be adopted. For example, the sintering is preferably performed by holding at a temperature of 850° C. or higher for 4 hours or longer and 24 hours or shorter. At this time, it is preferable to hold, for 3 hours or longer, at a temperature (850° C. or higher and 1280° C. or lower) suitable for generating the ferrite particle having a spinel crystal structure. However, the sintering temperature and the holding time are not particularly limited as long as the ferrite particle satisfying the formula (1) and the formula (2) is obtained.

4-1-4. Cooling Step

After obtaining a sintered product by sintering the granulated product in the closed type heat treatment chamber as described above, the sintered product is cooled to 250° C. or lower in the cooling chamber in which the atmospheric oxygen concentration is controlled to less than 0.3 vol % without being brought into contact with the outside air. A surface temperature of the sintered product is high immediately after sintering, and a surface of the sintered product is in a state of high activity. The ferrite sintered in a low-oxygen atmosphere is considered to have an oxygen-deficient spinel crystal structure. Therefore, in a case where the sintered product is brought into contact with oxygen in the atmosphere as described above, the surface of the sintered product is oxidized, and an oxide film is formed to increase the resistance. Therefore, in the present invention, after obtaining a sintered product, the sintered product is cooled in the cooling chamber in which the atmosphere is controlled as described above without being brought into contact with the outside air, whereby the sintered product can be taken out in a state where the activity of the surface of the sintered product is reduced.

However, a closed type heat treatment furnace including a closed type heat treatment chamber capable of controlling a sintering atmosphere and a cooling chamber capable of controlling a cooling atmosphere to an atmosphere different from the sintering atmosphere is used in the sintering step and the cooling step.

In a case where the atmospheric oxygen concentration in the cooling chamber becomes 0.3 vol % or more, the sintered product is carried into the cooling chamber in a state where the activity of the surface is high, and thus reacts with oxygen in the cooling chamber without being into contact with the outside air, and the oxide film is formed on the surface of the sintered product as described above. Therefore, it is difficult to form a coating layer having a lattice constant satisfying the formula (2) in relation to the lattice constant of the ferrite particle body in the subsequent surface heat treatment step, which is not preferable.

From the above viewpoint, the atmospheric oxygen concentration in the cooling chamber is more preferably 0.2 vol % or less, and still more preferably 0.1 vol % or less.

4-1-5. Surface Heat Treatment Step

The sintered product cooled as described above is used as a surface heat treatment object, and the sintered product is subjected to the surface heat treatment. A rotary furnace is used for the surface heat treatment. At this time, the following formula (3) is preferably satisfied when an inner diameter of a rotary incineration chamber of the rotary furnace is defined as L (m), the number of revolutions is defined as X (rpm), and the surface heat treatment time is defined as t (min).

$$20 \leq L\pi Xt \leq 60 \quad (3)$$

As such a rotary furnace, for example, a rotary continuous furnace such as a rotary kiln is preferably used. The rotary kiln includes a rotary incineration chamber, an inlet through which a surface heat treatment object (heat treatment object) is charged into the rotary incineration chamber, and an outlet through which the surface heat treatment object subjected to the surface heat treatment (heat treatment) is discharged from the rotary incineration chamber, and the surface heat treatment object can be continuously supplied from the inlet to the rotary incineration chamber at a preset constant supply rate with respect to the rotary incineration chamber. The rotary incineration chamber generally has a substantially cylindrical shape and has a gentle downward inclination from an inlet side toward an outlet side. The surface heat treatment object charged through the inlet is moved toward the outlet side while being rotated in the rotary incineration chamber. The surface heat treatment time (t) is a time from when the surface heat treatment object is charged into the rotary incineration chamber through the inlet to when the object is discharged from the rotary incineration chamber through the outlet, and represents a time when the surface heat treatment object (each particle) passes through the rotary incineration chamber while rotating for a time t.

In a case where the surface of the sintered product is subjected to heat treatment using such a rotary furnace, the surface of the sintered product is thermally decomposed, a surface layer portion of the sintered product becomes $3(Mg_x, Mn_{(1-x)})Fe_2O_4 \rightarrow (1-x)Mn_3O_4 + 3xMgFe_2O_4 + 2(1-x)Fe_3O_4$ as described above, which is a coating layer made of a composite including $Mn_3O_4$, $Fe_3O_4$, and $MgFe_2O_4$, and the inside thereof becomes a ferrite particle body. In a case where the surface of the sintered product is subjected to the heat treatment so that the value of the formula (3) falls within the above range, the surface of the sintered product is sufficiently thermally decomposed. As a result, it is possible to obtain a ferrite particle in which the coating layer is formed on the surface of the ferrite particle body with a uniform thickness and which satisfies the formula (1) and the formula (2).

In contrast, in a case where the value of the formula (3) is less than 20, the surface of the sintered product cannot be sufficiently subjected to the heat treatment, and the coating layer may not be provided on the surface of the sintered product with a uniform thickness. In this case, the coating layer is locally provided on the surface of the ferrite particle body represented by the formula (1), or the thickness is reduced, and the value of the formula (2) may be less than a lower limit value thereof. On the other hand, in a case where the value of the formula (3) is larger than 60, the thermal decomposition of the surface proceeds excessively, the amount of $Mn_3O_4$ generated increases, and as a result, the value of the formula (2) may exceed an upper limit value thereof.

From this viewpoint, a lower limit value of the formula (3) is preferably larger than 20. An upper limit value thereof is preferably smaller than 60, more preferably 50, and still more preferably 40.

It is preferable that the surface heat treatment is performed at 350° C. or higher and 600° C. or lower, and preferably 400° C. or higher and 550° C. or lower in an oxygen-containing atmosphere such as air. By subjecting the surface of the surface heat treatment object to the heat treatment under such surface heat treatment conditions, it is possible to more suitably produce the ferrite particle satisfying the formula (1) and the formula (2).

On the other hand, when the surface heat treatment temperature is lower than 350° C., the surface of the sintered product cannot be sufficiently heated, and the coating layer may not be provided on the surface of the sintered product with a uniform thickness. On the other hand, when the surface heat treatment temperature is higher than 600° C., an oxidation reaction of $Fe_2O_3$ and $Mn_3O_4$ caused by thermal decomposition may occur. Specifically, reactions of $2Fe_3O_4 + \frac{1}{2}O_2 \rightarrow 3Fe_2O_3$ and $2Mn_3O_4 + \frac{1}{2}O_2 \rightarrow 3Mn_2O_3$ occur, and the value of the above formula (2) may exceed the upper limit value. In this case, the saturation magnetization of the ferrite particle may decrease.

4-1-6. Crushing and Classification Step

After the cooling step and/or the surface heat treatment step, the sintered product or the sintered product after the surface heat treatment is deagglomerated and classified. As a classification method, the particle size may be adjusted to a desired particle diameter by using an existing air classification method, a mesh filtration method, a precipitation method, or the like. In a case where dry recovery is performed, the recovery may be performed by a cyclone or the like. In a case where the particle size is adjusted, two or more types of the above-described classification methods may be selected and performed, and coarse particles and fine particles may be removed by changing the conditions by one classification method. In particular, when the surface heat treatment step is performed after the crushing and the classification are performed after the cooling step, the surface heat treatment step can be uniformly performed on the surface of the sintered product, which is preferable.

4-2. Carrier for Electrophotographic Developer

In the carrier for an electrophotographic developer according to the present invention, the above-described ferrite particle is used as a core material, and a resin coating layer is provided on the surface of the ferrite particle. The resin constituting the resin coating layer is as described above. When the resin coating layer is formed on the surface of the ferrite particle, a known method, for example, a brush coating method, a spray drying method using a fluidized bed, a rotary drying method, a liquid immersion drying method using a universal stirrer, or the like can be adopted. In order to improve a ratio of a coating area of the resin to the surface of the ferrite particle (resin coating ratio), it is preferable to adopt a spray drying method using a fluidized bed. In either method, the ferrite particle can be subjected to a resin coating treatment once or a plurality of times. A resin coating liquid used for forming the resin coating layer may contain the additives described above. The resin coating amount on the surface of the ferrite particle is as described above, and thus the description thereof is omitted here.

After the resin coating liquid is applied to the surface of the ferrite particle, curing may be performed by an external heating method or an internal heating method as necessary. In the external heating method, a fixed or fluidized electric furnace, a rotary electric furnace, a burner furnace, or the like can be used. In the internal heating method, a microwave furnace can be used. In the case where a UV curable resin is used as the coating resin, a UV heater is used. The curing is required to be performed at a temperature equal to or higher than a melting point or a glass transition point of the coating resin. In a case where a thermosetting resin, a condensation-crosslinking resin, or the like is used as the coating resin, it is necessary to perform the curing at a temperature at which curing of the resin sufficiently progresses.

4-3. Electrophotographic Developer

Next, the method for producing the electrophotographic developer according to the present invention will be described.

The electrophotographic developer according to the present invention includes the above-described carrier for an electrophotographic developer and a toner. As described above, both the polymerized toner and the pulverized toner can be preferably used as the toner.

The polymerized toner can be produced by a known method such as a suspension polymerization method, an emulsion polymerization method, an emulsion aggregation method, an ester elongation polymerization method, or a phase transition emulsion method. For example, a colored dispersion liquid in which a colorant is dispersed in water by using a surfactant, a polymerizable monomer, a surfactant, and a polymerization initiator are mixed and stirred in an aqueous medium, the polymerizable monomer is emulsified and dispersed in the aqueous medium, followed by performing polymerization while stirring and mixing, and then a salting agent is added to salt-out a polymer particle. The particle obtained by salting is filtered, washed, and dried to obtain a polymerized toner. Thereafter, an external additive may be added to the dried toner particle as necessary.

Further, in the production of the polymerized toner particle, a toner composition containing a polymerizable monomer, a surfactant, a polymerization initiator, a colorant, and the like is used. The toner composition may be blended with a fixability-improving agent and a charge control agent.

As the pulverized toner, for example, a binder resin, a colorant, and a charge control agent are sufficiently mixed with a mixer such as a Henschel mixer, followed by being melt-kneaded with a twin-screw extruder or the like, uniformly dispersed, cooled, finely pulverized with a jet mill or the like, classified, and then classified with a wind classifier or the like to obtain a toner having a desired particle diameter. Wax, a magnetic powder, a viscosity modifier, and other additives may be contained as necessary. Further, an external additive may be added after classification.

EXAMPLES

Next, the present invention will be specifically described with reference to Examples and Comparative Examples. However, the present invention is not limited to the following Examples.

Example 1

(1) Ferrite Particle

In Example 1, an MnO raw material, an MgO raw material, an $Fe_2O_3$ raw material, and an SrO raw material were weighed so that a blending ratio was MnO: 50.0 mol %, MgO: 4.0 mol %, $Fe_2O_3$: 46.0 mol %, and SrO: 0.8 mol %. Here, trimanganese tetraoxide was used as the MnO raw material, magnesium oxide was used as the MgO raw material, ferric oxide was used as the $Fe_2O_3$ raw material, and strontium carbonate was used as the SrO raw material. In addition, regarding the above formula (4), $n_{Fe}=46.0\times 2=92.0$, $n_{Mn}=50.0$, $n_{Mg}=4.0$, and $n_{Fe}/(n_{Mn}+n_{Mg})=1.70$.

Next, the weighed raw materials were pulverized for 5 hours by a dry media mill (vibration mill, stainless steel beads having a diameter of ⅛ inch), and a slurry binder and a dispersant were added thereto. PVA (polyvinyl alcohol, 20 mass % solution) was used as a binder, and 0.2 mass % of PVA was added to a solid content (raw material amount in a slurry). A polycarboxylic acid dispersant was added as the dispersant to adjust a viscosity of the slurry to 2 poises. Then, the raw materials were granulated and dried by a spray dryer.

Thereafter, the granulated product was held, for 5 hours, in a closed type heat treatment chamber of a tunnel-type electric furnace as a closed type atmosphere heat treatment furnace at a sintering temperature (holding temperature) of 1,250° C. in an atmosphere having an oxygen concentration of 0.0 vol % in a closed type heat treatment furnace, thereby performing sintering on the granulated product. At this time, a heating rate was 150° C./hour.

An obtained sintered product was cooled to 100° C. in a cooling chamber in which the oxygen concentration was controlled to 0.0 vol %, without being brought into contact with the outside air. Hereinafter, a temperature at which the sintered product should reach when the sintered product was cooled in a cooling step was referred to as a cooling temperature.

In the tunnel electric furnace used in the present example, the closed type heat treatment chamber and the cooling chamber were connected to each other, and the sintered product accommodated in a saggar could be conveyed, by a belt conveyor, to the cooling chamber without being brought into contact with the outside air. Further, the cooling chamber could be controlled to have an atmosphere different from that of the closed type heat treatment chamber independently of the closed type heat treatment chamber and the cooling chamber.

The sintered product that reached a predetermined cooling temperature (100° C.) was deagglomerated by a hammer crusher, which was an impact type pulverizer, and was further classified by a gyro shifter using a batch screening method and a turbo classifier into an air flow classification chamber rotary type to adjust a particle size, and a low magnetic product was separated by magnetic separation.

Then, the number of revolutions X (rpm) and a surface heat treatment time t (min) were adjusted with respect to an inner diameter L (m) of a rotary incineration chamber using a rotary kiln so that the value of the formula (3) ($L\pi Xt$) was 60, and the surface of the sintered product after cooling was subjected to heat treatment at 450° C.

A ferrite particle according to Example 1 was obtained by the above steps.

(2) Carrier for Electrophotographic Developer

The ferrite particle was used as a core material, and a resin coating layer was formed on a surface of the ferrite particle as described below, thereby obtaining a carrier according to Example 1.

First, a condensed crosslinked silicone resin (weight average molecular weight: about 8,000) containing T units and D units as main components was prepared. In a universal mixing and stirring machine, 2.5 parts by mass of this silicone resin solution (0.5 parts by mass as a silicone resin solid content because a solution having a resin solution concentration of 20 mass % was used, dilution solvent: toluene) and 100 parts by mass of the ferrite particle were mixed and stirred, and a surface of the ferrite particle was coated with a silicone resin while evaporating toluene. After confirming that toluene was sufficiently volatilized, the ferrite particle was taken out of the machine, placed in a container, and subjected to heat treatment in a hot air heating oven at 250° C. for 2 hours. Thereafter, the ferrite particle which was cooled to a room temperature and in which the resin on the surface was cured was taken out, aggregation of the particle was released with a 200-mesh vibration sieve, and a non-magnetic matter was removed using a magnetic separator. Thereafter, coarse particles were removed again by a 200-mesh vibration sieve to obtain the carrier for an electrophotographic developer according to Example 1 in which the ferrite particle was used as a core material and a resin coating layer was provided on the surface thereof.

Example 2

A ferrite particle according to Example 2 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 58.0 mol %, MgO: 0.2 mol %, $Fe_2O_3$: 41.8 mol %, and SrO: 1.2 mol %, a sintering temperature was 1,270° C., a cooling temperature at which the sintered product should reach in a cooling step was 250° C., a surface heat treatment temperature was 370° C., and a value of the formula (3) during the surface heat treatment was "20". A value of the above formula (4) was "1.44". A carrier for an electrophotographic developer according to Example 2 was obtained in the same manner as in Example 1 except that this ferrite particle was used.

Example 3

A ferrite particle according to Example 3 was produced in the same manner as in Example 1 except that an MnO raw material, an MgO raw material, an $Fe_2O_3$ raw material, and an SrO raw material were weighed so that a blending ratio of the respective raw materials was MnO: 50.0 mol %, MgO: 0.1 mol %, $Fe_2O_3$: 49.9 mol %, and SrO: 0.8 mol %, a sintering temperature was 1,270° C., a surface heat treatment temperature was 490° C., and a value of the formula (3) during the surface heat treatment was "40". A value of the above formula (4) was "1.99". A carrier for an electrophotographic developer according to Example 3 was obtained in the same manner as in Example 1 except that this ferrite particle was used.

Example 4

A ferrite particle according to Example 4 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 58.0 mol %, MgO: 5.0 mol %, $Fe_2O_3$: 37.0 mol %, and SrO: 0.8 mol %, a sintering temperature was 1,230° C., a surface heat treatment temperature was 510° C., and a value of the formula (3) during the surface heat treatment was "60". A value of the above formula (4) was "1.17". A carrier for an electrophotographic developer according to Example 4 was obtained in the same manner as in Example 1 except that this ferrite particle was used.

Example 5

A ferrite particle according to Example 5 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 55.0 mol %, MgO: 6.5 mol %, $Fe_2O_3$: 38.5 mol %, and SrO: 0.4 mol %, a sintering temperature was 1,240° C., a surface heat treatment temperature was 500° C., and a value of the formula (3) during the surface heat treatment was "40". A value of the above formula (4) was "1.25". A carrier for an electrophotographic developer according to Example 5 was obtained in the same manner as in Example 1 except that this ferrite particle was used.

Example 6

A ferrite particle according to Example 6 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 71.3 mol %, MgO: 0.1 mol %, $Fe_2O_3$: 28.6 mol %, and SrO: 1.0 mol %, a sintering temperature was 1,260° C., a cooling temperature at which the sintered product should reach in a cooling step was 50° C., a surface heat treatment temperature was 450° C., and a value of the formula (3) during the surface heat treatment was "45". A value of the above formula (4) was "0.80". A carrier for an electrophotographic developer according to Example 6 was obtained in the same manner as in Example 1 except that this ferrite particle was used.

Comparative Example 1

A ferrite particle according to Comparative Example 1 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 40.4 mol %, MgO: 9.0 mol %, $Fe_2O_3$: 50.6 mol %, and SrO: 0.3 mol %, a sintering temperature was 1,180° C., an oxygen concentration in a sintering atmosphere was 0.7 vol %, a cooling temperature at which a sintered product should reach in a cooling step was 300° C., an oxygen concentration in a cooling atmosphere was 0.6 vol %, a surface heat treatment temperature was 350° C., and a value of the formula (3) during the surface heat treatment was "15". A value of the above formula (4) was "2.05". A carrier for an electrophotographic developer according to Comparative Example 1 was obtained in the same manner as in Example 1 except that this ferrite particle was used.

Comparative Example 2

A ferrite particle according to Comparative Example 2 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 45.0 mol %, MgO: 2.0 mol %, $Fe_2O_3$: 53.0 mol %, and SrO: 0.8 mol %, a sintering temperature was 1,200° C., an oxygen concentration in a sintering atmosphere is 0.0 vol %, a cooling temperature at which a sintered product should reach in a cooling step was 250° C., an oxygen concentration in a cooling atmosphere is 0.2 vol %, and a surface heat treatment temperature was not performed. A value of the above formula (4) was "2.26". A carrier for an electrophotographic developer according to Comparative Example 2 was obtained in the same manner as in Example 1 except that this ferrite particle was used.

Comparative Example 3

A ferrite particle according to Comparative Example 3 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 46.0 mol %, MgO: 2.5 mol %, $Fe_2O_3$: 51.5 mol %, and SrO: 0.8 mol %, a sintering temperature was 1,200° C., an oxygen concentration in a sintering atmosphere was 1.0 vol %, a cooling temperature at which a sintered product should reach in a cooling step was 300° C., an oxygen concentration in a cooling atmosphere was 0.0 vol %, a surface heat treatment temperature was 350° C., and a value of the formula (3) during the surface heat treatment was "10". A value of the above formula (4) was "2.12". A carrier for an electrophotographic developer according to Comparative Example 3 was obtained in the same manner as in Example 1 except that this ferrite particle was used.

Comparative Example 4

A ferrite particle according to Comparative Example 4 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 35.0 mol %, MgO: 6.0 mol %, $Fe_2O_3$: 59.0 mol %, and SrO: 1.3 mol %, a sintering temperature was 1,150° C., an oxygen concentration in a sintering atmosphere was 0.0 vol %, a cooling temperature at which a sintered product should reach in a cooling step was 250° C., an oxygen concentration in a cooling atmosphere was 0.5 vol %, a surface heat treatment temperature was 520° C., and a value of the formula (3) during the surface heat treatment was "62". A value of the above formula (4) was "2.88". A carrier for an electrophotographic developer according to Comparative Example 4 was obtained in the same manner as in Example 1 except that this ferrite particle was used.

Comparative Example 5

A ferrite particle according to Comparative Example 1 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 50.0 mol %, MgO: 1.0 mol %, $Fe_2O_3$: 49.0 mol %, and SrO: 1.0 mol %, a sintering temperature was 1,230° C., an oxygen concentration in a sintering atmosphere was 0.7 vol %, a cooling temperature at which a sintered product should reach in a cooling step was 200° C., an oxygen concentration in a cooling atmosphere was 0.0 vol %, and a surface heat treatment temperature was not performed. A value of the above formula (4) was "1.92". A carrier for an electrophotographic developer according to Comparative Example 5 was obtained in the same manner as in Example 1 except that this ferrite particle was used.

Comparative Example 6

A ferrite particle according to Comparative Example 1 was produced by producing a ferrite particle in the same manner as in Example 1 except that an MnO raw material, an MgO raw material, an $Fe_2O_3$ raw material, and an SrO raw material were weighed so that a blending ratio of the respective raw materials was MnO: 36.0 mol %, MgO: 2.0 mol %, $Fe_2O_3$: 62.0 mol %, and SrO: 0.8 mol %, a sintering temperature was 1,200° C., an oxygen concentration in a sintering atmosphere was 1.1 vol %, a cooling temperature at which a sintered product should reach in a cooling step was 300° C., an oxygen concentration in a cooling atmosphere was 0.4 vol %, a surface heat treatment temperature was 520° C., and a value of the formula (3) during the surface heat treatment was "70". A value of the above formula (4) was "3.26". A carrier for an electrophotographic developer according to Comparative Example 6 was obtained in the same manner as in Example 1 except that this ferrite particle was used.

Table 1 shows production conditions of the ferrite particles according to Examples and Comparative Examples.

[Evaluation]

1. Evaluation Method (1) Crystal Structure

With respect to the ferrite particles according to Examples and Comparative Examples, (a) the half width of the (311) plane in the powder X-ray diffraction pattern and (b) the lattice constants of the ferrite particle body and the coating layer are measured by the above method, and (c) the lattice constant difference $D_{LC}$ between the ferrite particle body and the coating layer is calculated.

(2) Value of "x" and "Sr Content"

ICP emission spectrometry is performed by the above method to determine the value of "x" and the "Sr content" in the formula (1).

(3) Basic Properties

For the ferrite particles according to Examples and Comparative Examples, (a) the saturation magnetization, (b) the surface roughness Rz, (c) the apparent density (AD), and (d) the BET specific surface area are measured by the above methods.

(4) Image Quality Properties

An electrophotographic developer is prepared using the carrier for an electrophotographic developer produced in each of Examples and Comparative Examples, and is evaluated for (a) the image density responsiveness, (b) the temporal change rate of charge amount, (c) the image density stability, (d) the beads carry over amount, and (e) the toner scattering amount.

The electrophotographic developer is prepared as follows.

18.6 g of the carrier for an electrophotographic developer produced in each of Examples and Comparative Examples and 1.4 g of a toner are stirred and mixed by a ball mill for 10 minutes to produce an electrophotographic developer having a toner concentration of 7.0 mass %. As the toner, a commercially available negative toner (cyan toner for DocuPrintC3530 manufactured by Fuji Xerox Corporation; average volume particle diameter ($D_{50}$) of about 5.8 μm) used in a full-color printer is used.

(a) Image Density Responsiveness

The electrophotographic developer prepared as described above is used as a specimen, and the image density responsiveness is determined in accordance with the following criteria using a charge amount measuring device.

As the charge amount measuring device, a magnet roll in which a magnet (magnetic flux density of 0.1 T) is disposed inside a cylindrical aluminum tube (hereinafter, referred to as a sleeve) having a diameter of 31 mm and a length of 76 mm, the magnet including eight poles in total with alternating N and S poles. A cylindrical electrode having a gap of 5.0 mm from the sleeve is disposed at an outer periphery of the sleeve. Further, 0.5 g of the electrophotographic developer as a specimen is uniformly attached to the sleeve, and then with the aluminum tube on an outer side being fixed, a DC voltage of 2,000 V is applied between the electrode on the outer side and the sleeve for 60 seconds while rotating the magnet roller on an inner side at 80 rpm, thereby transferring the toner to the cylindrical electrode on the outer side, and a mass of the toner transferred to the electrode on the outer side (toner transfer amount) is measured. Similarly, the toner transfer amount when a DC voltage of 2,500V is applied between the outer electrode and the sleeve for 60 seconds is measured. An electrometer (insulation resistance meter model 6517A manufactured by KEITHLEY) is used as the cylindrical electrode on the outer side. Then, the toner transfer amount when the applied voltage is 2,000V is defined as T2K, the toner transfer amount when the applied voltage is 2,500V is defined as T2.5K, and the reproducibility of the image density when the applied voltage is varied is evaluated as the image density responsiveness by the following equation.

$$\text{IMAGE DENSITY RESPONSIVENESS (\%)} = (T2.5K - T2K)/T2.5K \times 100$$

Evaluations A to D are performed according to the following determination criteria based on a value of the image density responsiveness obtained for each specimen.

A: less than 5%
B: 5% or more and less than 10%
C: 10% or more and less than 15%
D: 15% or more (b) Temporal Change Rate of Charge Amount The charge amount is measured as follows. The electrophotographic developer prepared as described above is used as a specimen, the specimen is exposed to an atmosphere of 20° C.±5° C. and a relative humidity of 50%±5% for 1 day, and then a DC voltage of 2,500V is applied for 60 seconds in the same manner as described above using a charge amount measuring device same as the charge amount measuring device used for evaluating the image density responsiveness, thereby transferring the toner to the electrode on the outer side. At this time, an electrometer (insulation resistance meter model 6517A, manufactured by KEITHLEY Corporation) is connected to the cylindrical electrode, and the electric charge amount of the toner transferred to the outer electrode is measured. The charge amount is calculated based on the measured electric charge amount and the transferred toner mass. The charge amount is defined as a charge amount before stirring.

The electrophotographic developer prepared as described above is placed in a glass bottle having a volume of 50 ml and stirred at a rotation speed of 150 rpm for 10 hours using a paint shaker manufactured by Asada Iron Works Co., Ltd., then the developer is taken out, and a DC voltage of 2,500V is applied for 60 seconds in the same manner as described above using the charge amount measuring device same as the charge amount measuring device used for evaluating the image density responsiveness, thereby transferring the toner to the electrode on the outer side. At this time, an electrometer (insulation resistance meter model 6517A, manufactured by KEITHLEY Corporation) is connected to the cylindrical electrode, and the electric charge amount of the toner transferred to the outer electrode is measured. The charge amount is calculated based on the measured electric charge amount and the transferred toner mass. The charge amount is defined as a charge amount after forced stirring (charge amount after stirring).

The temporal change rate of the charge amount is calculated by the following equation, and is evaluated according to the following criteria.

$$\text{TEMPORAL CHANGE RATE OF CHARGE AMOUNT (\%)} = |(\text{CHARGE AMOUNT AFTER STIRRING}) - (\text{CHARGE AMOUNT BEFORE STIRRING})| / (\text{CHARGE AMOUNT BEFORE STIRRING}) \times 100$$

A: less than 1.5%
B: 1.5% or more and less than 3.0%
C: 3.0% or more and less than 5.0%
D: 5.0% or more (c) Image Density Stability The electrophotographic developer prepared as described above is used as a specimen, and a charge amount of the carrier after the specimen is exposed in an atmosphere at 60° C. and a relative humidity of 80% for one day is measured in the same manner as in the measurement on the "temporal change rate of charge amount" and is defined as a charge amount C1. Similarly, a charge amount of the carrier after the specimen is exposed to the atmosphere at 60° C. and a relative humidity of 80% for 15 days is measured and is defined as a charge amount C15.

The change rate of the charge amount is calculated based on the following equation, and the image density stability is evaluated from the change rate of the charge amount according to the following criteria.

$$\text{CHANGE RATE (\%) OF CHARGE AMOUNT} = |C1 - C15|/C1 \times 100$$

A: less than 5%
B: 5% or more and less than 10%
C: 10% or more and less than 15%
D: 15% or more (d) Beads carry over Amount The beads carry over is evaluated as follows using the electrophotographic developer prepared as described above as a specimen.

A charge amount measuring device same as the charge amount measuring device used for evaluating the image density responsiveness is used, 1 g of the electrophotographic developer is uniformly attached to the sleeve, and then with the aluminum tube on the outer side being fixed, a DC voltage of 2,500 V is applied between the electrode on the outer side and the sleeve for 90 seconds while rotating the magnet roller on the inner side at 80 rpm, thereby transferring the toner to the cylindrical electrode on the outer side. After 90 seconds elapse, the applied voltage is cut off, the rotation of the magnet roll is stopped, then the electrode on the outer side is removed, and the number of the carrier particle attached together with the toner transferred to the electrode is measured. Evaluations A to D are performed according to the following criteria based on the measured number of carrier particle.

A: The number of the attached carrier particle is less than 20.

B: The number of the attached carrier particle is 20 or more and less than 40.

C: The number of the attached carrier particle is 40 or more and less than 50.

D: The number of the attached carrier particle is 50 or more.

(e) Toner Scattering Amount

A magnet roll in which a magnet (magnetic flux density of 0.1 T) including eight poles in total with alternating N and S poles is disposed and a cutting board provided via a gap of 1.0 mm from the magnet roll are installed, and a measurement unit of a particle counter is installed at a position of 50 mm from the cutting board that is in contact with a developer, thereby obtaining a toner scattering amount measurement device. In order to prevent the toner scattering due to the influence of the outside air from occurring and the measured value from varying, the toner scattering amount is measured in a clean room of class 1,000 at 20° C.±5° C. and 50%±5%. In the measurement on the toner scattering amount, particles having a particle diameter of 5 μm among particles attached to the cutting board while the magnet roll is rotated at 80 rpm for 10 minutes are counted as an object to be counted, the number of particles per minute (number of particles per 1 L of volume) is obtained from the integrated number of particles, and the evaluations A to D are performed based on the following criteria.

A: less than 500/L

B: 500/L or more and less than 1,000/L

C: 1,000/L or more and less than 1,600/L

D: 1,600/L or more

In the above evaluation method, evaluation closer to an actual state of image quality properties by an electrophotographic developer can be performed as compared with an actual machine evaluation in which the image density responsiveness, the temporal change rate of the charge amount, the image density stability, the beads carry over amount, and the toner scattering amount are evaluated by an actual machine (image forming device). In recent years, the performance of an actual machine or an electrophotographic developer has been improved, and there may be almost no difference in printing in an actual machine. In addition, variation may occur in an evaluation result due to a model of the actual machine used in a test or aged deterioration of the actual machine itself. On the other hand, measurement conditions can be strictly controlled according to the alternative evaluation by the charge amount measuring device as described above, and a width of one evaluation zone can be increased as compared with a case of the actual machine evaluation. Further, in the above alternative evaluation, a rotation speed of the magnet roll is set to an extremely low speed of 80 rpm. Therefore, it is possible to more precisely evaluate the image quality properties of the electrophotographic developer at the time of performing printing using an actual machine having a medium-to-low continuous copying speed of 40 sheets/min or less.

2. Evaluation Results

Table 2 shows various types of data relating to the crystal structure obtained in each of Examples and Comparative Examples. Table 3 shows evaluation results of the basic properties of the ferrite particle according to each of Examples and Comparative Examples. Table 4 shows evaluation results of the image quality properties of the electrophotographic developer using the ferrite particle according to each of Examples and Comparative Examples as the carrier core material.

(1) Crystal Structure

As shown in Table 2, in the ferrite particles according to the respective Examples, the Fe raw material, the Mn raw material, and the Mg raw material are blended so that the blending amounts of the raw materials are such that the value of the formula (4) ($n_{Fe}/(n_{Mn}+n_{Mg})$) is 0.80 or more and less than 2.00 to prepare a granulated product, and the value of the formula (3) (LπXt) is 20 or more and 60 or less at the time of performing the surface heat treatment, whereby the difference ($D_{LC}$) between the lattice constant of the ferrite particle body and the lattice constant of the coating layer is 0.040 Å to 0.062 Å, and the lattice constant of the ferrite particle body is 8.500 Å or more, resulting in the A-rich ferrite defined above. In addition, it is confirmed by ICP emission spectrometry that the value of "x" in the formula (1) is 0.001 to 0.106. Accordingly, it is confirmed that the ferrite particle according to the present invention of the formula (1) and the formula (2) is obtained. In addition, the half width of the (311) plane in the X-ray diffraction pattern of the ferrite particle according to each of Examples is 0.26° to 0.33°, which is larger than that of the ferrite particle according to each of Comparative Examples, and therefore, it is also presumed that the ferrite particle according to each of Examples has a wider magnetic distribution than the ferrite particle according to each of Comparative Examples.

(2) Basic Properties

Next, the basic properties of Examples and Comparative Examples will be compared based on Table 3. The ferrite particles according to Examples 1 to 6 of the present invention have saturation magnetization of 51 $Am^2/kg$ to 75 $Am^2/kg$, and the ferrite particles according to Comparative Examples 1 to 6 have saturation magnetization of 69 $Am^2/kg$ to 86 $Am^2/kg$. Although some of the ferrite particle bodies according to the respective Examples have saturation magnetization values equivalent to those of the ferrite particles according to the respective Comparative Examples, the ferrite particles according to the respective Examples have a content ratio of Mn higher than that of the ferrite particles according to the respective Comparative Examples, and therefore, it can be said that the ferrite particles according to Examples have lower magnetization as a whole.

In addition, the apparent density of the ferrite particles according to Examples is 2.26 $g/cm^3$ to 2.35 $g/cm^3$, whereas the apparent density of the ferrite particles according to Comparative Examples is 1.91 $g/cm^3$ to 2.20 $g/cm^3$, and it can be said that the ferrite particles according to Examples tend to have a higher apparent density as a whole. The surface roughness Rz of the ferrite particles according to Examples is 2.5 μm to 3.5 μm, whereas the surface roughness Rz of the ferrite particles according to Comparative Examples is 2.0 μm to 2.1 μm, and the ferrite particles according to Examples indicate a larger surface roughness Rz as a whole. The BET specific surface area of the ferrite particles according to Examples is 0.050 $m^2/g$ to 0.128 $m^2/g$, whereas the BET specific surface area of the ferrite particles according to Comparative Examples is 0.152 $m^2/g$ to 0.173 $m^2/g$, and the ferrite particles according to Examples indicate a smaller BET specific surface area. Accordingly, it is confirmed that the ferrite particles according to Examples have a larger surface unevenness as compared with the ferrite particles according to Comparative Examples. Therefore, when the ferrite particle is used as a core material and a resin coating layer is provided on a surface of the core material to form a carrier, the ferrite particles according to Examples have many portions where the core material is exposed, the reduction in resistance of the carrier is promoted, and occurrence of development memory can be suppressed.

(3) Image Quality Properties

According to Table 4, when an electrophotographic developer using the ferrite particle according to the present example as a carrier core material is used, a high evaluation "A" or "B" is obtained for the "image density responsiveness", the "temporal change rate of charge amount", the "image density stability", the "beads carry over", and the "toner scattering amount". In particular, an evaluation "A" is obtained for all items of the ferrite particle according to Example 1, and it is confirmed that the ferrite particle is a carrier core material extremely suitable for an electrophotographic developer suitable for medium-to-low speed printing. On the other hand, regarding Comparative Examples, the evaluation "A" is obtained for the "toner scattering amount" except for Comparative Example 1. However, a low evaluation "C" or "D" is obtained for both the "image density responsiveness" and the "image density stability", and a low evaluation "C" or "D" is obtained for the "temporal change rate of charge amount" except for Comparative Examples 4 and 6.

A reason why such a result is obtained is considered as follows.

First, it is considered that the surface properties of the particle affect the toner scattering amount, but it is confirmed that an electrophotographic developer having a small toner scattering amount can be obtained except for Comparative Example 1 in which the Sr content largely deviates from a range of 0.4 mol or more and 1.2 mol or less when the total substance amount of Fe, Mn, and Mg is defined as 100 mol.

Next, it is considered that the coating layer content ratio affects the temporal change rate of the charge amount. As described above, in a case where the coating layer is provided only locally on the surface of the ferrite particle body, the ferrite particle body is oxidized at the exposed portion, and the surface resistance of the core material changes over time. In the ferrite particle according to the present examples, it is considered that an electrophotographic developer in which the coating layer content ratio is in a range of 5 mass % or more and 35 mass % or less and the change rate of the charge amount is small is obtained. In the ferrite particles according to Comparative Examples 4 and 6, the content ratio of the coating layer exceeds 35 mass %. In a case where the content ratio of the coating layer exceeds 35 mass %, reactions of $2Fe_3O_4+\frac{1}{2}O_2 \rightarrow 3Fe_2O_3$ and $2Mn_3O_4+\frac{1}{2}O_2 \rightarrow 3Mn_2O_3$ occur as a result of excessive thermal decomposition of the surface of the ferrite particle, and further oxidation does not occur, and therefore, the temporal change rate of the charge amount becomes small as in Comparative Examples 4 and 6.

The image density responsiveness and the image density stability are considered as follows. The ferrite particle according to each of Examples satisfies the formula (1) and the formula (2), and thus is an A-rich ferrite in which the Mn occupancy rate at each lattice point is high as described above, and it is possible to suppress the magnetization from becoming extremely high as compared with a B-rich ferrite in which the $Fe^{3+}$ occupancy rate at each lattice point is high. In addition, the half width of the (311) plane in the X-ray diffraction pattern of the ferrite particle according to each Example is larger as compared with the ferrite particle according to each Comparative Example, and it is confirmed that as described above, the magnetic force distribution in the case of an A-rich ferrite tends to be wide. Accordingly, the ferrite particle according to each Example is easy to loosen the magnetic coupling between the particles and is excellent in stirring property and mixing property, as compared with the ferrite particles according to Comparative Examples 1 to 4 and Comparative Example 6 which are B-rich ferrites. Therefore, the frequency of collision between particles per unit time is high, and the toner can be rapidly charged to a saturated charge amount. As a result, even when the applied voltage is varied from 2,000V to 2,500V as in an evaluation test of the image density responsiveness, the same image density can be maintained regardless of the applied voltage, and an electrophotographic developer having high image density responsiveness can be obtained. In addition, the coating layer ratio is 5% to 35% in the ferrite particle according to each Example, and it is considered that the entire surface of the ferrite particle body is covered by the coating layer. Therefore, it is possible to suppress, by the coating layer, oxidation of the ferrite particle body due to contact with oxygen in the atmosphere, and it is possible to suppress the surface resistance of the carrier core material from increasing over time. Comparative Example 5 is an A-rich ferrite, but is not provided with a coating layer, and therefore, it is considered that the evaluation on the image density responsiveness, the image density stability, and the like is reduced.

TABLE 1

| | Blending ratio (mol %) | | | | Formula (4) | Sintering temperature |
|---|---|---|---|---|---|---|
| | MnO | MgO | $Fe_2O_3$ | SrO | $n_{Fe}/(n_{Mn} + n_{Mg})$ | (° C.) |
| Example 1 | 50.0 | 4.0 | 46.0 | 0.8 | 1.70 | 1,250 |
| Example 2 | 58.0 | 0.2 | 41.8 | 1.2 | 1.44 | 1,270 |
| Example 3 | 50.0 | 0.1 | 49.9 | 0.8 | 1.99 | 1,270 |
| Example 4 | 58.0 | 5.0 | 37.0 | 0.8 | 1.17 | 1,230 |
| Example 5 | 55.0 | 6.5 | 38.5 | 0.4 | 1.25 | 1,240 |
| Example 6 | 71.3 | 0.1 | 28.6 | 1.0 | 0.80 | 1,260 |
| Comparative example 1 | 40.4 | 9.0 | 50.6 | 0.3 | 2.05 | 1,180 |
| Comparative example 2 | 45.0 | 2.0 | 53.0 | 0.8 | 2.26 | 1,200 |
| Comparative example 3 | 46.0 | 2.5 | 51.5 | 0.8 | 2.12 | 1,200 |

TABLE 1-continued

| | | | | | | |
|---|---|---|---|---|---|---|
| Comparative example 4 | 35.0 | 6.0 | 59.0 | 1.3 | 2.88 | 1,150 |
| Comparative example 5 | 50.0 | 1.0 | 49.0 | 1.0 | 1.92 | 1,230 |
| Comparative example 6 | 36.0 | 2.0 | 62.0 | 0.8 | 3.26 | 1,200 |

| | Sintering atmosphere ($O_2$ vol %) | Cooling temperature (° C.) | Cooling atmosphere ($O_2$ vol %) | Surface oxidation treatment (° C.) | Formula (3) LπXt |
|---|---|---|---|---|---|
| Example 1 | 0.0 | 100.0 | 0.0 | 450 | 60 |
| Example 2 | 0.0 | 250.0 | 0.0 | 370 | 20 |
| Example 3 | 0.0 | 100.0 | 0.0 | 490 | 40 |
| Example 4 | 0.0 | 100.0 | 0.0 | 510 | 60 |
| Example 5 | 0.0 | 100.0 | 0.0 | 500 | 40 |
| Example 6 | 0.0 | 50.0 | 0.0 | 450 | 45 |
| Comparative example 1 | 0.7 | 300.0 | 0.6 | 350 | 15 |
| Comparative example 2 | 0.0 | 250.0 | 0.2 | — | — |
| Comparative example 3 | 1.0 | 300.0 | 0.0 | 350 | 10 |
| Comparative example 4 | 0.0 | 250.0 | 0.5 | 520 | 62 |
| Comparative example 5 | 0.7 | 200.0 | 0.0 | — | — |
| Comparative example 6 | 1.1 | 300.0 | 0.4 | 520 | 70 |

TABLE 2

| | Half width | Lattice constant (Å) | | | Coating layer ratio | $(Mg_xMn_{(1-x)})Fe_2O_4$ | ICP (mol %) | | | ICP (mol) |
|---|---|---|---|---|---|---|---|---|---|---|
| | | Particle body | Coating layer | $D_{Lc}$※ | | | | | | |
| | (°) | | | | (%) | x | Mn | Mg | Fe | Sr |
| Example 1 | 0.26 | 8.502 | 8.456 | 0.046 | 25 | 0.074 | 34.20 | 2.73 | 63.07 | 0.76 |
| Example 2 | 0.30 | 8.516 | 8.454 | 0.062 | 5 | 0.003 | 40.82 | 0.13 | 59.05 | 1.18 |
| Example 3 | 0.28 | 8.510 | 8.459 | 0.051 | 28 | 0.002 | 33.32 | 0.06 | 66.62 | 0.78 |
| Example 4 | 0.33 | 8.506 | 8.457 | 0.049 | 35 | 0.079 | 42.28 | 3.64 | 54.08 | 0.76 |
| Example 5 | 0.28 | 8.500 | 8.460 | 0.040 | 29 | 0.106 | 39.62 | 4.69 | 55.69 | 0.39 |
| Example 6 | 0.29 | 8.528 | 8.474 | 0.054 | 22 | 0.001 | 55.43 | 0.08 | 44.49 | 0.97 |
| Comparative example 1 | 0.16 | 8.484 | 8.461 | 0.023 | 3 | 0.182 | 26.73 | 5.97 | 67.31 | 0.25 |
| Comparative example 2 | 0.15 | 8.497 | 8.497 | 0.000 | 0 | 0.042 | 29.31 | 1.30 | 69.38 | 0.78 |
| Comparative example 3 | 0.20 | 8.499 | 8.476 | 0.023 | 2 | 0.051 | 30.33 | 1.65 | 68.03 | 0.77 |
| Comparative example 4 | 0.19 | 8.479 | 8.444 | 0.035 | 37 | 0.146 | 22.00 | 3.77 | 74.23 | 1.29 |
| Comparative example 5 | 0.20 | 8.508 | 8.508 | 0.000 | 0 | 0.020 | 33.51 | 0.67 | 65.82 | 1.00 |
| Comparative example 6 | 0.12 | 8.483 | 8.448 | 0.035 | 39 | 0.052 | 22.19 | 1.23 | 76.58 | 0.79 |

※$D_{Lc}$ = (lattice constant of ferrite particle body) − (lattice constant of coating layer)

TABLE 3

| | Saturation magnetization ($Am^2/kg$) | Rz (μm) | Apparent density ($g/cm^3$) | BET specific surface area ($m^2/g$) |
|---|---|---|---|---|
| Example 1 | 66 | 3.4 | 2.29 | 0.082 |
| Example 2 | 75 | 3.5 | 2.33 | 0.078 |
| Example 3 | 75 | 3.2 | 2.26 | 0.128 |
| Example 4 | 51 | 3.4 | 2.32 | 0.101 |
| Example 5 | 55 | 2.5 | 2.33 | 0.107 |
| Example 6 | 54 | 3.5 | 2.35 | 0.050 |

TABLE 3-continued

| | Saturation magnetization ($Am^2/kg$) | Rz (μm) | Apparent density ($g/cm^3$) | BET specific surface area ($m^2/g$) |
|---|---|---|---|---|
| Comparative example 1 | 70 | 2.1 | 2.09 | 0.152 |
| Comparative example 2 | 79 | 2.1 | 2.11 | 0.166 |
| Comparative example 3 | 69 | 2.1 | 2.14 | 0.165 |

TABLE 3-continued

| | Saturation magnetization ($Am^2/kg$) | Rz (μm) | Apparent density ($g/cm^3$) | BET specific surface area ($m^2/g$) |
|---|---|---|---|---|
| Comparative example 4 | 86 | 2.0 | 2.01 | 0.170 |
| Comparative example 5 | 72 | 2.1 | 2.20 | 0.163 |
| Comparative example 6 | 79 | 2.0 | 1.91 | 0.173 |

TABLE 4

| | Image density responsiveness | Temporal change rate of charge amount | Image density stability | Beads carry over amount | Toner scat-tering amount |
|---|---|---|---|---|---|
| Example 1 | A | A | A | A | A |
| Example 2 | B | B | B | A | A |
| Example 3 | B | A | A | B | A |
| Example 4 | A | A | A | A | A |
| Example 5 | A | B | A | B | B |
| Example 6 | A | A | B | B | A |
| Comparative example 1 | C | C | C | D | C |
| Comparative example 2 | D | D | D | C | A |
| Comparative example 3 | D | C | D | D | A |
| Comparative example 4 | C | A | D | C | A |
| Comparative example 5 | D | D | D | B | A |
| Comparative example 6 | C | A | C | C | A |

INDUSTRIAL APPLICABILITY

According to the present invention, it is possible to provide a carrier core material for an electrophotographic developer, which is excellent in stirring property and mixing property between a toner and a carrier and which can suppress occurrence of an image defect in an initial stage of printing even when an environment is varied, a carrier for an electrophotographic developer, and an electrophotographic developer.

The present invention has been described in detail with reference to specific embodiments, but it is apparent to those skilled in the art that various changes and modifications can be made without departing from the spirit and scope of the present invention.

The present application is based on the Japanese patent application No. 2021-089756 filed on May 28, 2021, and the contents thereof are incorporated herein by reference.

The invention claimed is:

1. A ferrite particle comprising:

a ferrite particle body having a spinel crystal structure belonging to a space group Fd-3m and having a spinel composition represented by the following formula (1); and a coating layer having a spinel crystal structure belonging to the space group Fd-3m and coating a surface of the ferrite particle body, wherein the coating layer is a layer obtained by subjecting a ferrite represented by the following formula (1) to a heat treatment, and a content ratio of the coating layer in the ferrite particle obtained by subjecting a powder X-ray diffraction pattern to Rietveld analysis is 5 mass % or more and 35 mass % or less, and the ferrite particle satisfies the following formula (2):

$$Mg_xMn_{(1-x)}Fe_2O_4 \quad (1)$$

$$0.040\ \text{Å} \le D_{LC} \le 0.070\ \text{Å} \quad (2)$$

wherein in the formula (1), $0.001 \le x < 0.300$, and in the formula (2), $D_{LC}$=(lattice constant of the ferrite particle body)−(lattice constant of the coating layer).

2. The ferrite particle according to claim 1, wherein a half width of a (311) plane in a powder X-ray diffraction pattern of the ferrite particle is 0.25° or more and 0.35° or less.

3. The ferrite particle according to claim 1, wherein when a total substance amount of Fe, Mn and Mg contained in the ferrite particle is defined as 100 mol, an Sr element is contained in an amount of 0.4 mol or more and 1.2 mol or less in addition to the spinel crystal constituent elements.

4. The ferrite particle according to claim 1, wherein saturation magnetization by B-H measurement at a time of applying a magnetic field of 3K·1000/4π·A/m is 50 $Am^2/kg$ or more and 75 $Am^2/kg$ or less.

5. The ferrite particle according to claim 1, wherein an apparent density is 2.23 $g/cm^3$ or more and 2.35 $g/cm^3$ or less, and a surface roughness Rz is 2.5 μm or more and 3.5 μm or less.

6. The ferrite particle according to claim 1, wherein a BET specific surface area is 0.070 $m^2/g$ or more and 0.150 $m^2/g$ or less.

7. A carrier for an electrophotographic developer, comprising:

the ferrite particle according to claim 1; and a resin coating layer which coats a surface of the ferrite particle.

8. An electrophotographic developer, comprising:

the carrier for an electrophotographic developer according to claim 7; and a toner.

9. The electrophotographic developer according to claim 8, which is used as a replenishment developer.

10. A method for producing the ferrite particle according to claim 1, comprising:

a step of obtaining a mixture by mixing an Fe raw material containing Fe, an Mn raw material containing Mn, and an Mg raw material containing Mg in predetermined amounts;

a step of obtaining a granulated product by using the mixture;

a step of obtaining a sintered product by sintering, using a closed type atmosphere heat treatment furnace including a closed type heat treatment chamber capable of controlling a sintering atmosphere and a cooling chamber capable of controlling a cooling atmosphere to an atmosphere different from the sintering atmosphere, the granulated product in the closed type heat treatment chamber;

a cooling step of cooling the sintered product to 250° C. or lower in the cooling chamber whose atmospheric oxygen concentration is controlled to less than 0.3 vol % without bringing the sintered product into contact with an outside air; and a step of subjecting the sintered product after the cooling step to a surface heat treatment.

11. The method for producing a ferrite particle according to claim 10, wherein the surface heat treatment is performed using a rotary furnace, and the following formula (3) is satisfied when an inner diameter of a rotary incineration chamber of the rotary furnace is denoted by L (m), a rotation speed is denoted by X (rpm), and a surface heat treatment time is denoted by t (min):

$$20 \leq L\pi Xt \leq 60. \quad (3)$$

12. The method for producing a ferrite particle according to claim 10, wherein a blending ratio of the Fe raw material, the Mn raw material, and the Mg raw material in the mixture satisfies the following formula (4):

$$0.80 \leq n_{Fe}/(n_{Mn} + n_{Mg}) < 2.00 \quad (4)$$

wherein $n_{Fe}$: substance amount (mol %) of Fe element in the Fe raw material $n_{Mn}$: substance amount (mol %) of Mn element in the Mn raw material $n_{Mg}$: substance amount (mol %) of Mg element in the Mg raw material.

13. The ferrite particle according to claim 2, wherein when a total substance amount of Fe, Mn and Mg contained in the ferrite particle is defined as 100 mol, an Sr element is contained in an amount of 0.4 mol or more and 1.2 mol or less in addition to the spinel crystal constituent elements.

14. The ferrite particle according to claim 2, wherein saturation magnetization by B-H measurement at a time of applying a magnetic field of 3K·1000/4π·A/m is 50 $Am^2/kg$ or more and 75 $Am^2/kg$ or less.

15. The ferrite particle according to claim 3, wherein saturation magnetization by B-H measurement at a time of applying a magnetic field of 3K·1000/4π·A/m is 50 $Am^2/kg$ or more and 75 $Am^2/kg$ or less.

16. The ferrite particle according to claim 2, wherein an apparent density is 2.23 $g/cm^3$ or more and 2.35 $g/cm^3$ or less, and a surface roughness Rz is 2.5 μm or more and 3.5 μm or less.

17. The ferrite particle according to claim 3, wherein an apparent density is 2.23 $g/cm^3$ or more and 2.35 $g/cm^3$ or less, and a surface roughness Rz is 2.5 μm or more and 3.5 μm or less.

18. The ferrite particle according to claim 4, wherein an apparent density is 2.23 $g/cm^3$ or more and 2.35 $g/cm^3$ or less, and a surface roughness Rz is 2.5 μm or more and 3.5 μm or less.

19. The ferrite particle according to claim 2, wherein a BET specific surface area is 0.070 $m^2/g$ or more and 0.150 $m^2/g$ or less.

20. The ferrite particle according to claim 3, wherein a BET specific surface area is 0.070 $m^2/g$ or more and 0.150 $m^2/g$ or less.

* * * * *